United States Patent
Sasaki et al.

(10) Patent No.: US 7,786,965 B2
(45) Date of Patent: Aug. 31, 2010

(54) LIQUID CRYSTAL DISPLAY DEVICE

(75) Inventors: Takahiro Sasaki, Mie (JP); Yuichi Inoue, Kameyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 964 days.

(21) Appl. No.: 11/441,341

(22) Filed: May 26, 2006

(65) Prior Publication Data

US 2006/0279497 A1 Dec. 14, 2006

(30) Foreign Application Priority Data

May 30, 2005 (JP) ............................. 2005-157632

(51) Int. Cl.
*G09G 3/36* (2006.01)
(52) U.S. Cl. .......................................... 345/89; 345/87
(58) Field of Classification Search .................. 345/87, 345/89; 349/38, 113, 114, 143
See application file for complete search history.

(56) References Cited

U.S. PATENT DOCUMENTS

| | | | |
|---|---|---|---|
| 6,407,783 B1 * | 6/2002 | Ohgawara et al. | 349/110 |
| 6,806,929 B2 * | 10/2004 | Chen et al. | 349/114 |
| 6,836,308 B2 | 12/2004 | Sawasaki et al. | |
| 6,879,364 B1 | 4/2005 | Sasaki et al. | |
| 6,930,739 B2 * | 8/2005 | Takeda et al. | 349/129 |
| 6,952,192 B2 | 10/2005 | Ohmuro et al. | |
| 7,064,801 B2 | 6/2006 | Kubo et al. | |
| 7,106,405 B2 * | 9/2006 | Okumura | 349/129 |
| 7,110,063 B2 | 9/2006 | Takeda et al. | |
| 7,245,345 B2 | 7/2007 | Sawasaki et al. | |
| 7,262,824 B2 | 8/2007 | Sasabayashi et al. | |
| 7,283,190 B2 | 10/2007 | Sasaki et al. | |
| 7,286,200 B2 | 10/2007 | Inoue et al. | |
| 7,289,178 B2 | 10/2007 | Sasabayashi et al. | |
| 7,321,412 B2 | 1/2008 | Sasaki et al. | |
| 7,358,948 B2 | 4/2008 | Shiomi et al. | |
| 7,405,789 B1 | 7/2008 | Sasaki et al. | |
| 7,426,009 B2 | 9/2008 | Sawasaki et al. | |
| 7,508,385 B2 | 3/2009 | Ueda et al. | |
| 7,593,081 B2 | 9/2009 | Sasaki et al. | |
| 7,656,465 B2 | 2/2010 | Takeda et al. | |
| 2001/0038369 A1 | 11/2001 | Adachi et al. | |
| 2003/0058264 A1 | 3/2003 | Takako et al. | |

(Continued)

FOREIGN PATENT DOCUMENTS

JP 2000-155317 A 6/2000

(Continued)

*Primary Examiner*—Amare Mengistu
*Assistant Examiner*—Dmitriy Bolotin
(74) *Attorney, Agent, or Firm*—Nixon & Vanderhye P.C.

(57) ABSTRACT

One picture element of a liquid crystal panel is divided into a region I where a cell gap is set to 4 μm and a region II where a transparent insulating film is formed and a cell gap is set to 2 μm. In the region I, there occurs a phenomenon (overshoot) that, when a voltage is applied, luminance becomes high immediately before an alignment of liquid crystal molecules becomes stable, and in the region II, no overshoot occurs. Response characteristics of an entire picture element are those obtained by synthesizing the response characteristics in these regions. Parameters such as an area ratio of the regions I and II, and cell gaps are set so that a maximum luminance value is not greater than 110% of the luminance at a stable time.

13 Claims, 26 Drawing Sheets

U.S. PATENT DOCUMENTS

| | | |
|---|---|---|
| 2003/0123000 A1* | 7/2003 | Sugiura et al. .............. 349/113 |
| 2004/0017343 A1 | 1/2004 | Adachi et al. |
| 2004/0039150 A1* | 2/2004 | Shin et al. .................. 528/170 |
| 2004/0105062 A1* | 6/2004 | Lai et al. .................... 349/129 |
| 2004/0165129 A1* | 8/2004 | Okumura .................... 349/114 |
| 2004/0246423 A1* | 12/2004 | Sasabayashi et al. ........ 349/130 |
| 2005/0062703 A1* | 3/2005 | Lee et al. ...................... 345/89 |
| 2006/0061528 A1* | 3/2006 | Roosendaal ................. 345/87 |
| 2006/0109406 A1 | 5/2006 | Sasabayashi et al. |
| 2006/0146243 A1* | 7/2006 | Nakanishi et al. ........... 349/139 |
| 2006/0221023 A1* | 10/2006 | Inoue et al. .................. 345/87 |
| 2007/0030421 A1 | 2/2007 | Sasaki et al. |
| 2008/0211756 A1 | 9/2008 | Shiomi et al. |
| 2009/0290110 A1 | 11/2009 | Sasaki et al. |
| 2009/0290111 A1 | 11/2009 | Sasaki et al. |

FOREIGN PATENT DOCUMENTS

| | | |
|---|---|---|
| JP | 2000-231091 | 8/2000 |
| JP | 2001-343956 | 12/2001 |
| JP | 2002-162629 A | 6/2002 |
| JP | 2003-156731 A | 5/2003 |
| JP | 2003-172915 | 6/2003 |
| JP | 2003-255305 A | 9/2003 |
| JP | 2004-4314 A | 1/2004 |
| JP | 2004-302460 A | 10/2004 |
| JP | 2004-318077 A | 11/2004 |
| JP | 2005-84237 A | 3/2005 |

\* cited by examiner

LIQUID CRYSTAL DISPLAY DEVICE

CROSS-REFERENCE TO RELATED APPLICATIONS

This application is based on and claims priority of Japanese Patent Application No. 2005-157632 filed on May 30, 2005, the entire contents of which are incorporated herein by reference.

BACKGROUND OF THE INVENTION

1. Field of the Invention

The present invention relates to a liquid crystal display device which is used for a display for personal computer, a television set, a projection projector, and the like, and particularly to a liquid crystal display device which has excellent response characteristics and is preferable in displaying moving images.

2. Description of the Prior Art

Liquid crystal display devices have advantages that they are thin and light, that they can be operative at low voltages, and that they have low power consumption. Accordingly, liquid crystal display devices are widely used in various kinds of electronic devices. In particular, active matrix liquid crystal display devices in which a thin film transistor (TFT) is provided as a switching element for each picture element show excellent display characteristics comparable to those of cathode-ray tube (CRT) displays, and therefore have come to be used not only for displays for personal computers, but also for television sets, projection projectors, and the like.

In general, a liquid crystal display device has a structure in which liquid crystals are sealed between two substrates being disposed to face each other. On one substrate, a TFT, a picture element electrode, and the like are formed, while color filters, a common electrode, and the like are formed on the other substrate. Hereinafter, a substrate on which a TFT, a picture element electrode, and the like are formed is referred to as a TFT substrate; and a substrate, which is disposed to face the TFT substrate, is referred to as an opposing substrate. A structure formed by sealing liquid crystals between the TFT substrate and the opposing substrate is referred to as a liquid crystal panel.

Polarizing plates are disposed respectively on both sides of a liquid crystal panel in a thickness direction thereof. By applying a voltage between a picture element electrode and a common electrode, an alignment state of liquid crystal molecules is changed so that the amount of light passing through these polarizing plates can be adjusted.

Heretofore, twisted nematic (TN) liquid crystal display devices have been widely used in which liquid crystals with positive dielectric anisotropy are sealed between two substrates and in which liquid crystal molecules are twisted and aligned. However, the TN liquid crystal display devices have a disadvantage that viewing angle characteristics are poor and that color contrast and color tone change to a large extent when the screen is viewed from an oblique direction. Accordingly, multi-domain vertical alignment (MVA) liquid crystal display devices, which have favorable viewing angle characteristics, have been developed and put into practical use.

In MVA liquid crystal display devices, liquid crystals with negative dielectric anisotropy are sealed between two substrates, and alignment control structures are disposed in order to form a plurality of domains in which alignment directions of liquid crystal molecules are different from one another in one picture element, when a voltage is applied. For the alignment control structures, for example, protrusions formed of dielectric materials and slits of electrodes are used.

FIG. 1 is a view showing an equivalent circuit for one picture element of a liquid crystal display device. As shown in FIG. 1, one picture element of the liquid crystal display device includes a TFT 10, a liquid crystal cell $C_{LC}$, and an auxiliary capacitance Cs. The liquid crystal cell $C_{LC}$ includes a picture element electrode, a common electrode, and liquid crystals interposed therebetween.

The TFT 10 is turned on/off by scanning signals supplied to a gate bus line 11. When the TFT 10 is turned on, display signals (display voltages) are supplied from a data bus line 12 to the liquid crystal cell $C_{LC}$ and the auxiliary capacitance Cs. Thereafter, even when the TFT 10 is turned off, the voltages held in the liquid crystal cell $C_{LC}$ and the auxiliary capacitance Cs are still applied to liquid crystals.

In liquid crystal display devices, after the voltage is applied between a picture element electrode and a common electrode, it takes time for all the liquid crystal molecules within a picture element to align in predetermined directions in accordance with the voltage. In addition, since liquid crystal molecules have dielectric anisotropy, a capacitance value of the liquid crystal cell $C_{LC}$ changes until the time at which all the liquid crystal molecules are aligned in predetermined directions after the voltage is applied. Consequently, the voltage applied to the liquid crystals decreases. Therefore, as shown in FIG. 1, the auxiliary capacitance Cs is connected to the liquid crystal cell $C_{LC}$ in parallel thereto so that a change in the voltage applied to the liquid crystals becomes small.

However, conventional liquid crystal display devices have a problem that after-images occur when displaying moving images, since response characteristics are not sufficient. FIG. 2 is a view showing the response characteristics of a conventional liquid crystal display device, with time after a first display signal is applied on the horizontal axis and with transmittance (luminance) on the vertical axis. As shown in FIG. 2, in the conventional liquid crystal display device, when the display is changed from a black display state to a white display state, a desired transmittance is not achieved when the first display signal is applied, and, in many cases, the desired transmittance is achieved when the second display signal is applied. In general, when transmittance in a white display is set to 100%, a response time is defined by time tr (rise time) which is required for the transmittance to change from 10% to 90%, and by time tf (fall time) which is required for the transmittance to change from 90% to 10%.

For improving response characteristics of liquid crystal display devices, an improvement of liquid crystal materials may be conceived. However, any liquid crystal materials, which have satisfactory response characteristics and which satisfy both of display capability and long-term reliability, have not so far been obtained.

It is also conceivable that the capacitance value of the auxiliary capacitance Cs is increased, and, thereby, decreasing an applied voltage due to dielectric anisotropy of liquid crystal molecules can be suppressed. However, in general, since an electrode constituting the auxiliary capacitance Cs is formed of metals, enlarging the electrode to increase the capacitance value results in decreasing an aperture ratio, and, hence, the screen becomes dark.

In coping with the above problems, a technology so-called overdrive, which improves response characteristics by using contrived driving techniques, was developed. This technology is that, for example, in a case of a liquid crystal display device in normally black (NB) mode, when the display is changed from a black display to a halftone display, a state change of liquid crystal molecules is accelerated by changing a voltage in three steps from a black display voltage (low voltage) to a white display voltage (high voltage), and to a halftone voltage (intermediate voltage).

In Japanese Patent Application Laid-open No. 2001-343956, it is descried that, in a liquid crystal display device in normally white (NW) mode, an overdrive driving is performed. In this liquid crystal display device, for example, between a black display (display voltage 5 V) and a white display (display voltage 2.2 V), a voltage (1.9 V) lower than the white display voltage is applied only for a period of one frame.

However, the overdrive has a disadvantage that since it is necessary to change a voltage supplied to data bus lines in three steps from a black display voltage to a white display voltage, and to a halftone voltage, driving circuits become complex. In addition, in an MVA liquid crystal display device in normally black mode, when the display is changed from a black display to a halftone display, a response time can be shortened by an overdrive; and, however, when the display is changed from a black display to a white display, a voltage higher than that in a white display can not be applied so that a response time can not be shortened.

In Japanese Patent Application Laid-open No. 2003-172915, it is described that, when the display is changed from a black display to a white display, a voltage higher than a white display voltage (highest tone voltage) is applied. However, in that case, it is also necessary to change a display voltage in three steps. In addition, it is necessary to form a TFT which has a high withstanding voltage, and thereby, it causes a problem that it is necessary to modify a design and processing.

In Japanese Patent Application Laid-open No. 2000-231091, when a display is changed from a black display to a halftone display, a voltage higher than a targeted voltage of a halftone display is applied. In that case, it also has a disadvantage that since it is necessary to change a voltage supplied to data bus lines in three steps, a driving circuit become complex.

SUMMARY OF THE INVENTION

In view of the above described problems, an object of the present invention is to provide a liquid crystal display device which does not require a complex driving circuit and which has superb response characteristics.

The above described problems can be solved by a liquid crystal display device which has following features. The liquid crystal display device includes a first substrate on which a picture element electrode is disposed in every picture element, a second substrate on which a common electrode is disposed and which is placed to face the first substrate, and liquid crystals which are sealed between the first substrate and the second substrate. In addition, the liquid crystal display device includes a first region in which, when a voltage applied to the picture element electrode changes from a first voltage to a second voltage, luminance increases up to a maximum point along with a change of an alignment state of liquid crystal molecules, and, thereafter, decreases down to a point at a stable time corresponding to the second voltage; and a second region in which the luminance increases along with a change of the alignment state of the liquid crystal molecules, and comes to a point at the stable time corresponding to the second voltage. Moreover a maximum luminance value over the entire picture element is not greater than 110% of the luminance at the stable time corresponding to the second voltage.

To make response characteristics in the first region and the second region to be the same as those described above, for example, a cell gap in the first region may be set to about 4 µm, and a cell gap in the second region may be set to about 2 µm. In addition, for example, slits of about 6 µm wide may be formed on an electrode in the first region as alignment control structures, and slits of about 12 µm wide may be formed on an electrode in the second region as alignment control structures. Furthermore, for example, when protrusions are formed as alignment control structures, height of protrusions in the first region may be set to about 0.8 µm, and height of protrusions in the second region may be set to about 2 µm.

Inventors of the present invention performed simulations of behavior of liquid crystal molecules during a period from a time at which a voltage is applied in a liquid crystal layer to a time at which the alignment becomes stable. The results thus obtained revealed that there was a phenomenon that transmittance (luminance) immediately before the alignment of the liquid crystal molecules becomes stable becomes higher than that at a time when the alignment thereof has become stable. In the present application, the above phenomenon is referred to as an overshoot. In the present invention, a response time of a liquid crystal display device is attempted to be shortened by using the overshoot.

In this case, when the peak luminance (maximum luminance) in the overshoot exceeds 110% of the luminance at the stable time, an after image is perceived. In the present invention, by forming two regions within one picture element, the proportion of overshoots of the entire picture element can be set to not greater than 110%. The two regions are one (a region I) in which overshoots occur in a sufficient proportion, and the other (a region II) in which overshoot rarely occurs are formed.

DESCRIPTION OF THE PREFERRED EMBODIMENTS

Embodiments of the present invention are, hereinafter, described with reference to the accompanying drawings.

Inventors of the present invention performed a simulation of a behavior of liquid crystal molecules during a period from a time at which a voltage is applied to a liquid crystal layer to a time at which alignment becomes stable, in an MVA liquid crystal display device. As a result, it is revealed that there is a phenomenon (overshoot), in which a transmittance (luminance) immediately before a time when the alignment of the liquid crystal molecules is stabilized is higher than that at a time when the alignment of the liquid crystal molecules is stabilized, in the MVA liquid crystal display device. In the present invention, response time of a liquid crystal display device was attempted to be shortened by using the overshoot.

Figure 1:
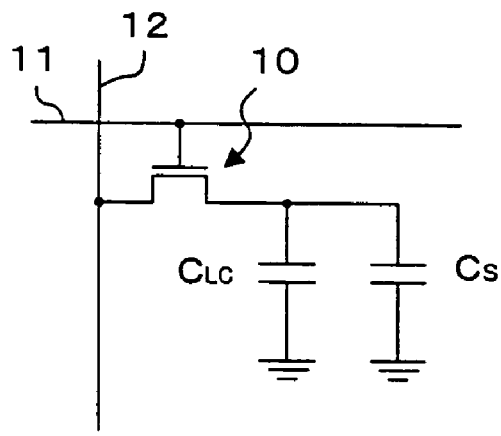
FIG. 1 is a view showing an equivalent circuit for one picture element of a liquid crystal display device.
Figure 2:
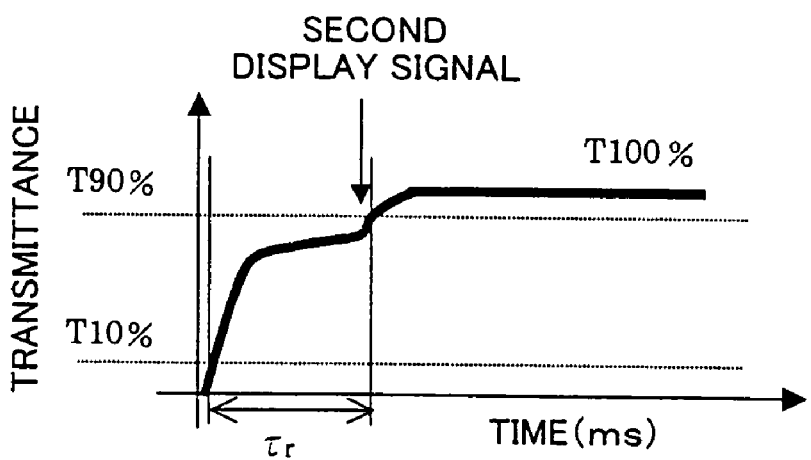
FIG. 2 is a view showing response characteristics of a conventional liquid crystal display device.
Figure 3:
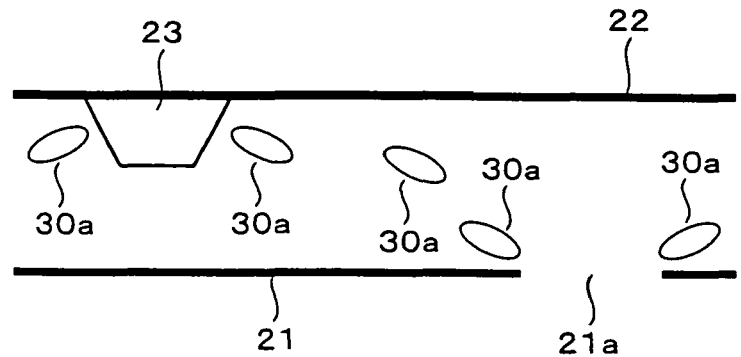
FIG. 3 is a schematic view showing an example of an MVA liquid crystal display device.

Prior to describing of the overshoot, the MVA liquid crystal display device is briefly described. FIG. 3 is a schematic view showing an example of the MVA liquid crystal display device. In the MVA liquid crystal display device, on one of two substrates constituting a liquid crystal panel, a picture element electrode 21 is formed, while a common electrode 22 is formed on the other substrate. In addition, polarizing plates (not illustrated) are disposed respectively on both sides of the liquid crystal panel in a thickness direction thereof in such a way that their absorption axes are orthogonal to each other.

A slit 21a is disposed as an alignment control structure in the picture element electrode 21, and a bank-shaped protrusion 23 formed of a dielectric material is disposed on the common electrode 22 (in FIG. 3, under the common electrode 22) as the alignment control structure. In addition, liquid crystals with negative dielectric anisotropy are sealed between the picture element electrode 21 and the common electrode 22. Surfaces of the picture element electrode 21, the common electrode 22, and the protrusion 23 are covered with vertical alignment films (not illustrated) formed of polyimide and the like.

In such an MVA liquid crystal display device, in a state where a voltage is not applied between the picture element electrode 21 and the common electrode 22, liquid crystal molecules 30a are aligned almost perpendicularly to substrates surfaces. However, the liquid crystal molecules 30a in the vicinity of the protrusion 23 are aligned in a direction perpendicular to an inclined surface of the protrusion 23.

When a predetermined voltage is applied between the picture element electrode 21 and the common electrode 22, the liquid crystal molecules 30a are inclined at an angle in accordance with a voltage. Right after applying a voltage, the liquid crystal molecules 30a in the vicinity of the protrusion 23 and the slit 21a are inclined in directions perpendicular to directions in which the protrusion 23 and the slit 21a are extended. On the other hand, the liquid crystal molecules 30a at positions away from the protrusion 23 and the slit 21a become in an unstable state, since although an inclination angle (an angle formed by a normal line perpendicular to the substrate surface, and by a major axis of a liquid crystal molecule) thereof is determined in accordance with a voltage, an inclination orientation (a direction of a line formed by projecting the major axis of the liquid crystal molecule on the substrate surface) thereof is not determined.

Thereafter, alignment states of the liquid crystal molecules 30a in the vicinity of the protrusion 23 and the slit 21a are propagated to the liquid crystal molecules 30a at positions away from the protrusion 23 and the slit 21. Accordingly, the inclination orientations of these liquid crystal molecules 30a are determined and their alignment states become stable.

Figure 4A:
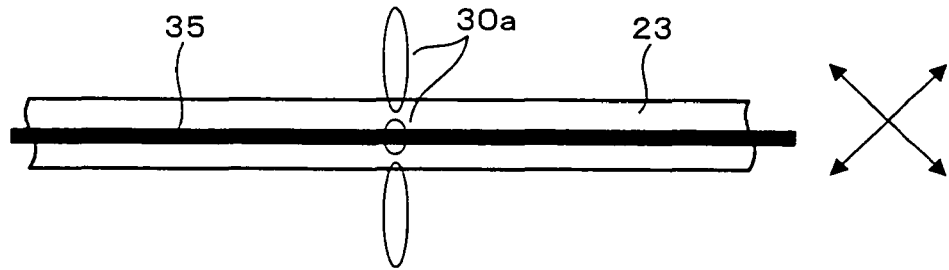
FIGS. 4A and 4B are schematic plan views showing alignment states of liquid crystal molecules in a region in the vicinity of a protrusion.
Figure 4B:
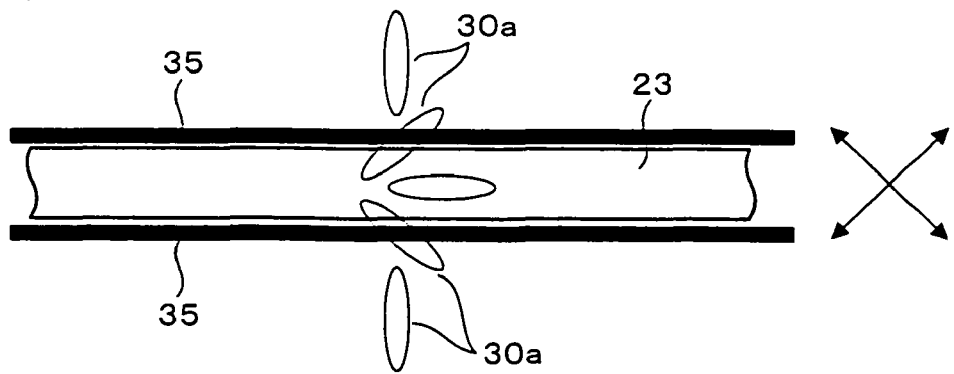

FIGS. 4A and 4B are schematic plan views showing alignment states of liquid crystal molecules in a region in the vicinity of the protrusion 23. With reference to the drawings of FIGS. 4A and 4B, a reason why an overshoot occurs is described. Incidentally, arrows in the drawings show directions of absorption axes of two polarizing plates, between which a liquid crystal panel is interposed. In this case, when a voltage is not applied between a picture element electrode and a common electrode, display becomes a black display (normally black).

Right after applying a voltage between the picture element and the common electrode, as shown in FIG. 4A, the liquid crystal molecules 30a on both sides of the protrusion 23 are inclined to orientations perpendicular to a direction in which the protrusion 23 is extended. However, it has not yet determined to which orientations the liquid crystal molecules 30a at positions of a central portion of the protrusion 23 are inclined. In this state, one dark line 35 occurs in the middle of the protrusion 23.

Thereafter, after a certain time has elapsed, as shown in FIG. 4B, the inclination orientations of the liquid crystal molecules 30a in the middle of the protrusion 23 are determined so as to continue to the alignments of the liquid crystal molecules 30a on both sides of the protrusion 23. In this case, the dark lines 35 occur respectively on portions where the inclination orientations of the liquid crystal molecules 30a are the same directions as those of the absorption axes of the polarizing plates, that is, the portions near edges of the both sides of the protrusion 23. Consequently, a transmittance is decreased in comparison with that in the state shown in FIG. 4A. It is conceived that an overshoot occurs due to change of the number of the dark lines 35.

In a case where an alignment control structure is a slit, as in the above, right after applying a voltage, one dark line occurs in the middle of the slit, and thereafter two dark lines occur near edges of both sides of the slit so that transmittance is reduced.

Figure 5:
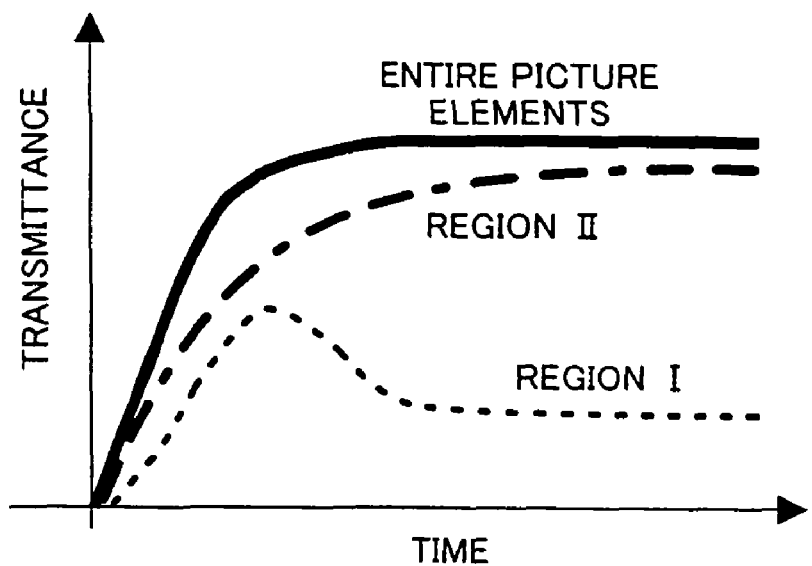
FIG. 5 is a view showing response characteristics in a case where a response time of liquid crystal molecules in a region between alignment control structures (protrusions and slits) is long.

FIG. 5 is a view showing a change of transmittance (response characteristics) during a period from a time at which a display signal is applied to a time at which transmittance becomes stable, with time on the horizontal axis and with transmittance on the vertical axis. As aforementioned, an alignment of liquid crystal molecules in a region in the vicinity of an alignment control structure (a protrusion or a slit) (hereinafter, referred to as "region I") become stable in a relatively short period of time after a display signal is applied to a picture element electrode. At this time, an overshoot occurs as shown by a dashed line in FIG. 5.

On the other hand, inclination orientations of liquid crystal molecules in a region away from alignment control structures (hereinafter, referred to as "region II") are not determined right after applying a voltage, and the alignment of the liquid crystal molecules in the vicinities of alignment control structures are propagated and the liquid crystal molecules are aligned in a predetermined direction. Accordingly, it takes a relatively long time that the alignment of the liquid crystal molecules in the region II becomes stable as shown by an alternate long and short dash line in FIG. 5.

A transmittance of the entire picture elements is one obtained by synthesizing transmittance in the region I and transmittance in the region II. Accordingly, when it is required to take a long time to stabilize the alignment of the liquid crystal molecules in the region II, an overshoot occurred in the region I is covered with response characteristics in the region II so that the overshoot does not occur in response characteristics of the entire picture elements, as shown by a solid line in FIG. 5.

Figure 6:
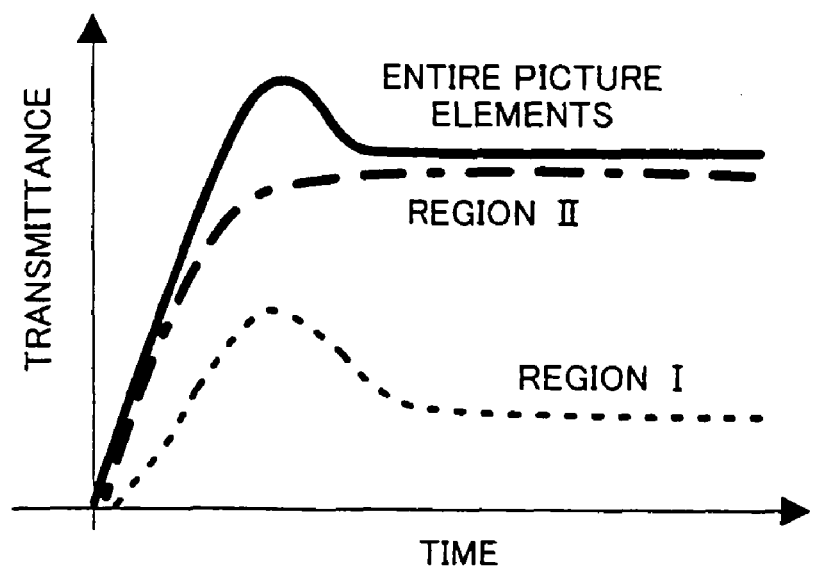
FIG. 6 is a view showing response characteristics in a case where a response time of liquid crystal molecules in a region between alignment control structures (protrusions and slits) is short.

FIG. 6 is a view showing response characteristics in a case where the response time of the liquid crystal molecules in a region (region II) between alignment control structures is short. As shown in FIG. 6, the response characteristics in the vicinity of an alignment control structure is the same as that shown in FIG. 5. However, when the response time is short in the region (region II) away from the alignment control structures, an overshoot is observed in the response characteristics of the entire picture elements. To shorten a response time of liquid crystal molecules in the region (region II) between the alignment control structures, it is considered, for example, to make an interval between the protrusion and the slit to be small.

Figure 7:
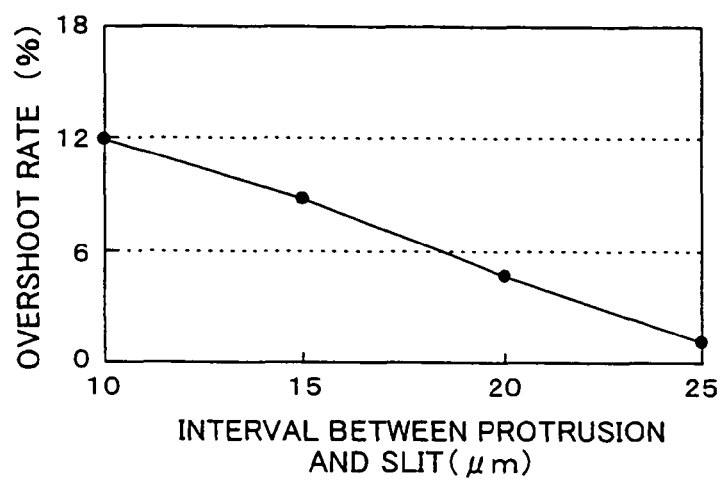
FIG. 7 is a view showing a simulation result on a relationship of an interval between protrusions and slits, and overshoot rates.
Figure 8:
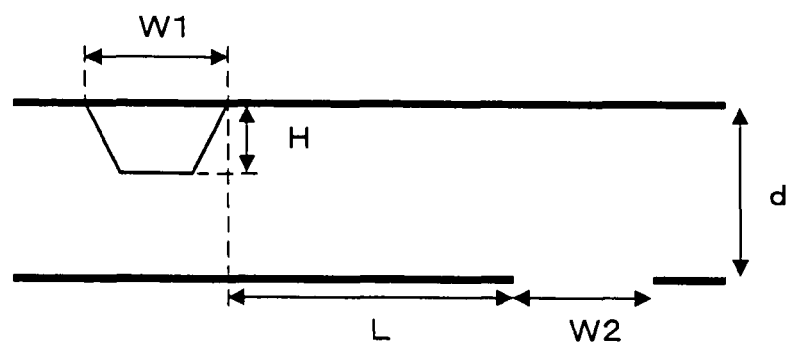
FIG. 8 is a view showing height and width of a protrusion, width of a slit, and an interval between the protrusion and the slit, and thickness of a liquid crystal layer.

In the present invention, the inventors performed a simulation with respect to a relationship on an interval between the protrusion and the slit, and a overshoot rate. The results are shown in FIG. 7. The interval between a protrusion and a slit is a length of a portion denoted by L shown in FIG. 8. In addition, here, the width W1 of the protrusion 23 is 12 μm, and the height H thereof is 1.4 μm; the width W2 of the slit 21a is 10 μm, and the thickness (cell gap) d of a liquid crystal layer is 3.8 μm.

Figure 9:
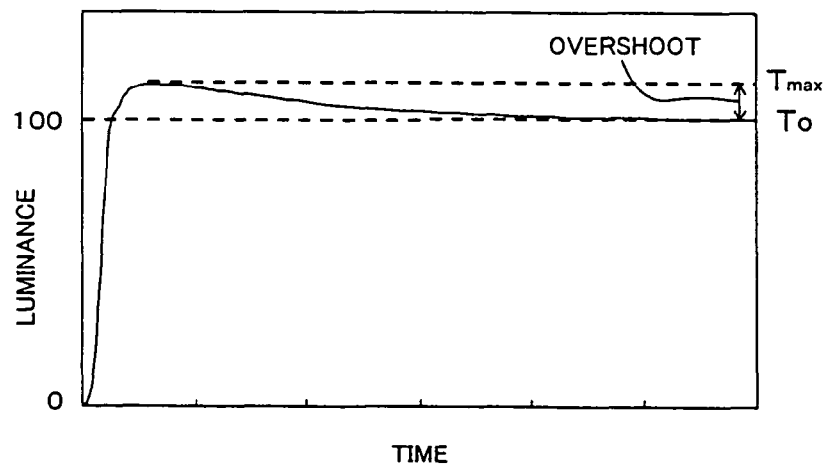
FIG. 9 is a view showing a definition of an overshoot.

As can be seen from FIG. 7, when the interval L between the protrusion and the slit is 25 μm, the overshoot rate is about 1%, and hence it is substantially negligible. However, when the interval L is 20 μm, the overshoot rate becomes about 5%; when the interval L is 15 μm, the overshoot rate becomes about 9%; and when the interval L is 10 μm, the overshoot rate becomes about 12%. Incidentally, here, as shown in FIG. 9, when To stands for luminance after stabilization in a white display, and Tmax stands for maximum luminance, the overshoot rate is defined as $(T_{max}-T_0) \times 100/T_0$.

As in the above, when the interval L is less than or equal to 20 μm, the overshoot rate becomes larger. Nevertheless, when the interval L between the protrusion 23 and the slit 21 becomes smaller than 10 μm, a ratio of an area of an alignment control structures (the protrusion or the slit) to an area of the picture element becomes large, and the aperture ratio is drastically decreased. Therefore, it is preferred that the interval L between the protrusion and the slit be in a range of 10 to 20 μm. However, even when the interval L is 25 μm, it is still possible to cause an overshoot to occur by setting proper conditions (parameters).

Figure 10:
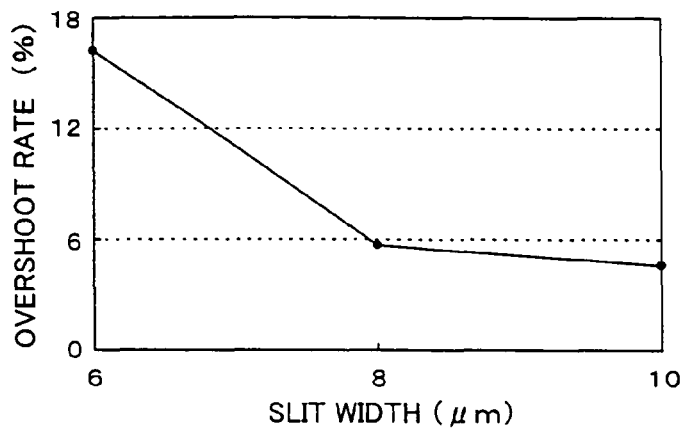
FIG. 10 is a view showing a simulation result on a relationship between slit width W2 and an overshoot rate.

FIG. 10 is a view showing a simulation result of a relationship between the slit width W2 and the overshoot rate, with the slit width W2 on the horizontal axis, and with the overshoot rate on the vertical axis. Note that, here, the protrusion width W1 is 12 μm, and the protrusion height H is 1.4 μm, the interval L between the protrusion and the slit is 20 μm, and the thickness (cell gap) d of a liquid crystal layer is 3.8 μm.

As shown in FIG. 10, when the slit width W2 is less than or equal to 10 μm, the overshoot rate exceeds about 5%. However, when the slit width W2 is smaller than 6 μm, alignment properties of the liquid crystal molecules in the vicinity of the slit is decreased.

Figure 11:
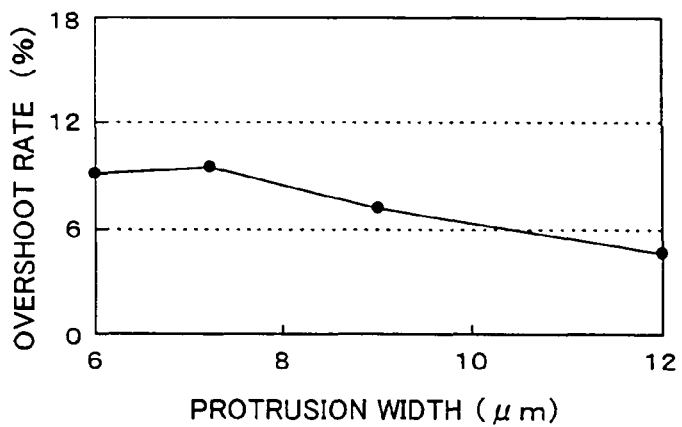
FIG. 11 is a view showing a simulation result of a relationship between protrusion width W1 and an overshoot rate.

FIG. 11 is a view showing a simulation result of a relationship between the protrusion width W1 and the overshoot rate, with the protrusion width W1 on the horizontal axis, and with the overshoot rate on the vertical axis. Here, the protrusion height H is 1.4 μm, the slit width W2 is 10 μm, the interval L between the protrusion and the slit is 20 μm, and the thickness (cell gap) d of a liquid crystal layer is 3.8 μm. As can be seen from FIG. 11, by making the protrusion width W1 not more than 12 μm, the overshoot rate can be not less than about 5%. However, when the protrusion width W1 becomes narrower than 6 μm, the alignment properties of the liquid crystal molecules in the vicinity of the protrusion is deteriorated.

Figure 12:
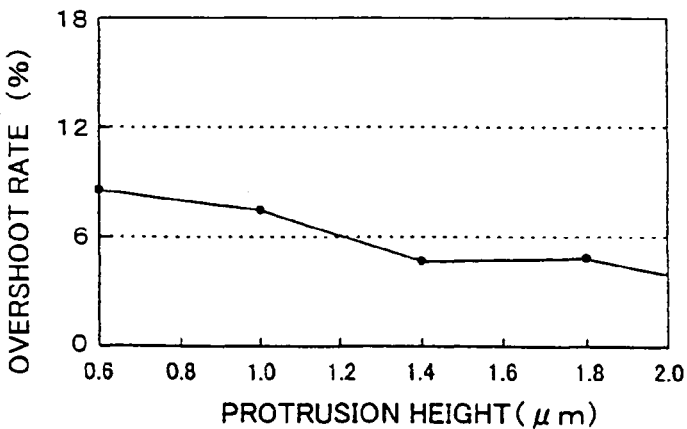
FIG. 12 is a view showing a simulation result of a relationship between protrusion height H and an overshoot rate.

FIG. 12 is a view showing a simulation result of a relationship between the protrusion height H and the overshoot rate, with the protrusion height H on the horizontal axis, and with the overshoot rate on the vertical axis. Here, the protrusion width W1 is 12 μm, the slit width W2 is 10 μm, the interval L between the protrusion and the slit is 20 μm, and the thickness (cell gap) d of a liquid crystal layer is 3.8 μm.

As can be seen from FIG. 12, by making the protrusion height H to be not more than 1.4 μm, the overshoot rate can be not less than about 5%. However, when the protrusion height H becomes smaller than 0.7 μm, the alignment properties of the liquid crystal molecules in the vicinity of the protrusion is impaired.

Figure 13A:
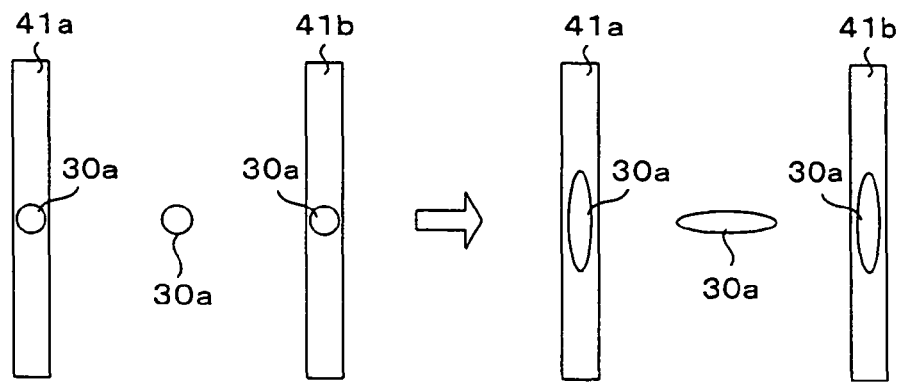
FIG. 13A is a view showing a change of an alignment state of liquid crystal molecules when a cell gap is small.

Furthermore, the inventors conducted various kinds of experiments, and found out that it is possible to control the overshoot by use of the thickness (cell gap) of the liquid crystal layer. When the cell gap is small, a large alignment regulate force acts due to the alignment control structures (the slit, the protrusion, or the like). Accordingly, as shown in FIG. 13A, when a voltage is applied, the liquid crystal molecules 30a in a region away from alignment control structures 41a and 41b, are inclined to an orientation perpendicular to the alignment control structures 41a and 41b, and come to a stable state.

Figure 13B:
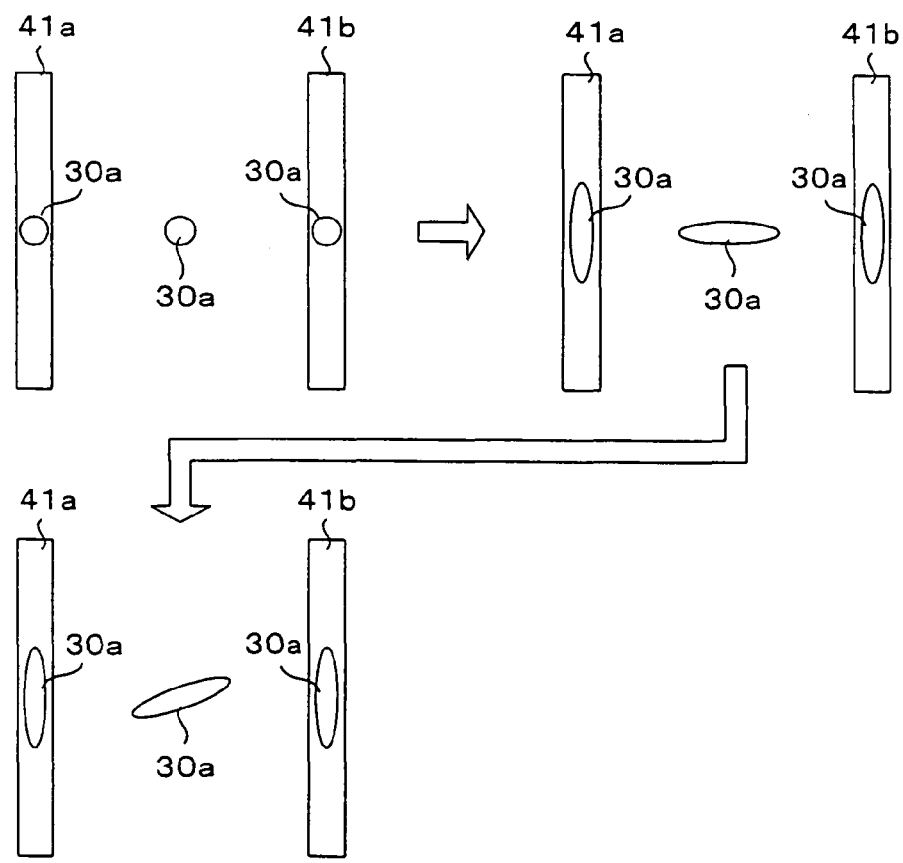
FIG. 13B is a view showing a change of an alignment state of liquid crystal molecules when a cell gap is large.

However, as shown in FIG. 13B, when the cell gap is large, the liquid crystal molecules 30a in a region away from the alignment control structures 41a and 41b, firstly, are inclined to an orientation perpendicular to the alignment control structures 41a and 41b. Thereafter, the liquid crystal molecules 30a are inclined to an orientation slightly deviated from the orientation perpendicular to the alignment control structures 41a and 41b, and come to a stable state. It is conceived that the above result was obtained because the liquid crystal molecules 30a over of the alignment control structures 41a and 41b are aligned in parallel to the alignment control structures 41a and 41b, and, when the cell gap is large, an alignment influence of the above described liquid crystal molecules 30a propagates slowly in the middle region of the liquid crystal layer in the thickness direction thereof.

Incidentally, the experimental results obtained by the inventors show that, when the overshoot rate exceeds 10%, after images are perceived. Therefore, in embodiments of the present invention, one picture element is provided therein with a region (region I) in which overshoots occur in sufficient proportion, and a region (region II) in which almost no overshoot occurs; and an area ratio of these two regions and the overshoot ratio in the region I are adjusted so that the overshoot ratio of the entire one picture element is not more than 10%.

Note that, when a peak overshoot does not exist within the first frame after a display signal is changed, an after image is perceived. Accordingly, it is preferred that each parameter is adjusted so that the peak overshoot exists within the first frame after a display signal is changed.

Liquid crystal display devices of the embodiments of the present invention are hereinafter described.

First Embodiment

Figure 14:
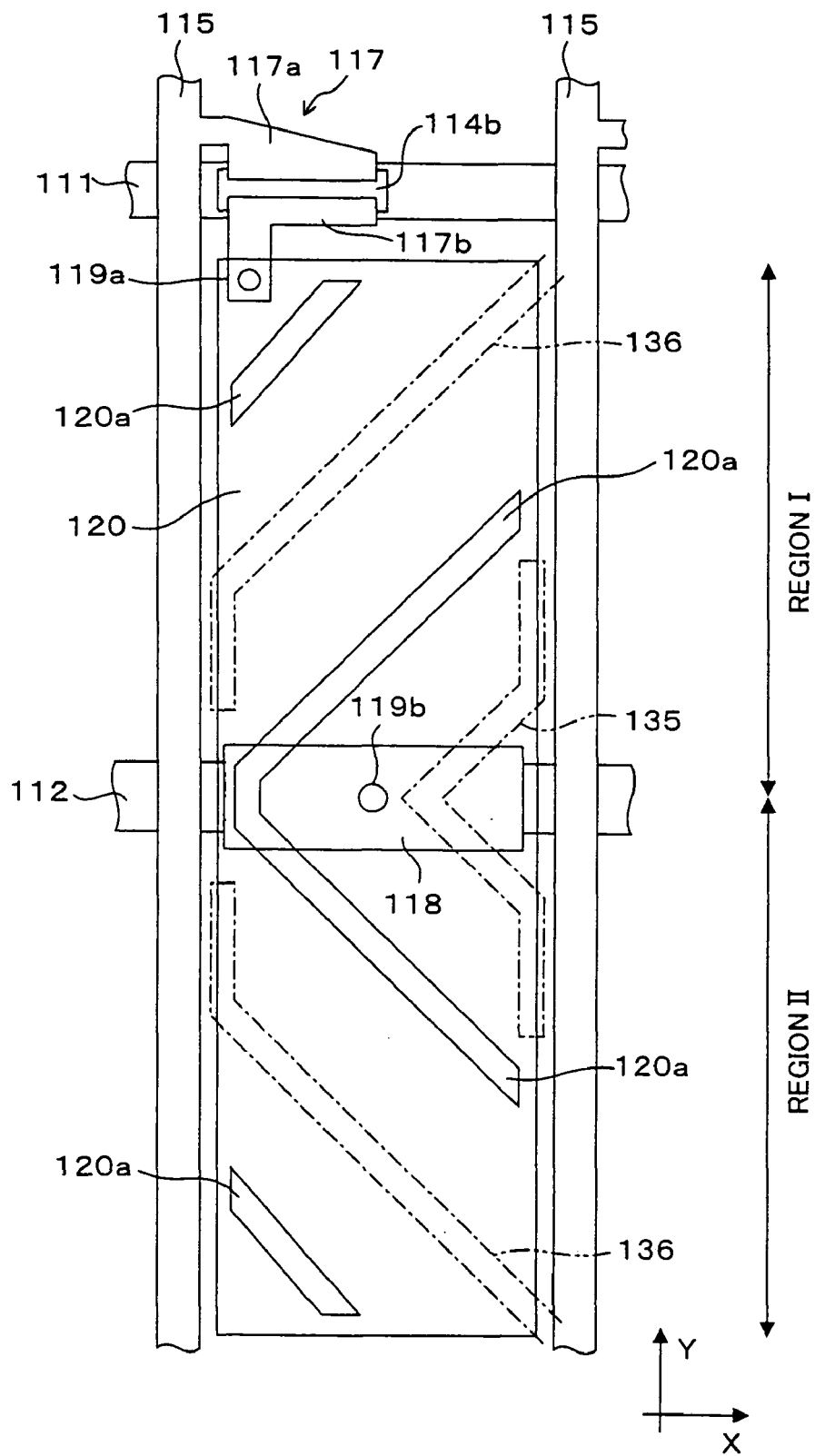
FIG. 14 is a plan view of a liquid crystal display device of a first embodiment of the present invention.
Figure 15:
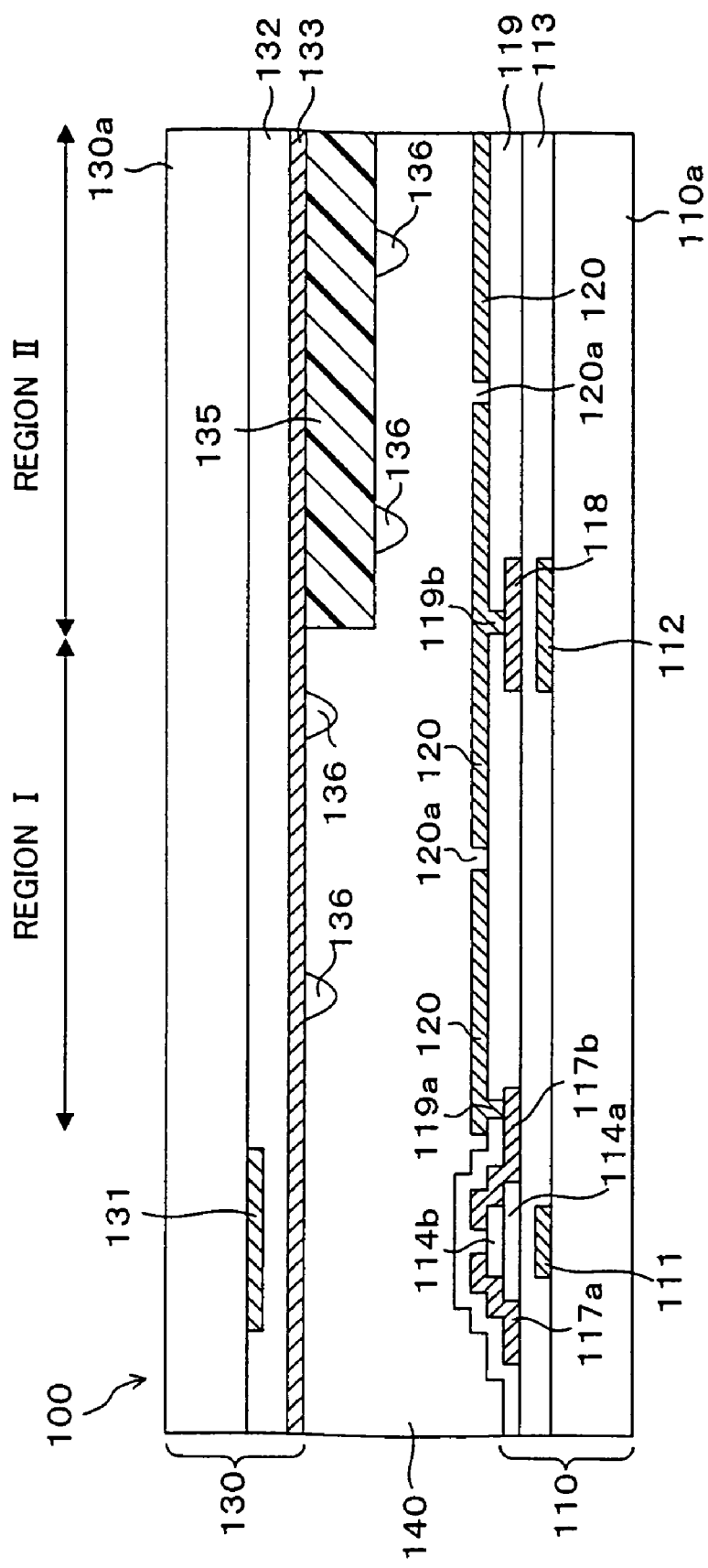
FIG. 15 is a schematic sectional view showing the liquid crystal display device of FIG. 14.

FIG. 14 is a plan view showing a liquid crystal display device of a first embodiment of the present invention, and FIG. 15 is a schematic sectional view of the same.

As shown in FIG. 15, a liquid crystal panel 100 includes a TFT substrate 110, an opposing substrate 130, and a liquid crystal layer 140 formed of liquid crystals with negative dielectric anisotropy. The liquid crystals are sealed between the TFT substrate 110 and the opposing substrate 130. Linearly polarizing plates (not illustrated) are placed, respectively, on the front side (from an observer's side; an upper side in FIG. 15) of the liquid crystal panel 100 and on the back side (a lower side in FIG. 15) thereof, and further a backlight (not illustrated) is placed on the back side thereof. One polarizing plate is disposed in a way that its absorption axis coincides with X-axis shown in FIG. 14, and the other polarizing plate is disposed in a way that its absorption axis coincides with Y-axis.

As shown in FIG. 14, on a glass substrate 110a, which is a base of the TFT substrate 110, a plurality of gate bus lines 111 extending in a horizontal direction (in a direction of X-axis) and a plurality of data bus lines 115 extending in a vertical direction (in a direction of Y-axis) are formed. The gate bus lines 111 are placed in the vertical direction at intervals of, for example, approximately 300 µm, and the data bus lines 115 are placed in the horizontal direction at intervals of, for example, approximately 100 µm. Rectangular regions divided by the gate bus lines 111 and the data bus lines 115 are, respectively, picture element regions. On the TFT substrate 110, auxiliary capacitance bus lines 112, which are placed in parallel to the gate bus lines 111 and which cross picture element regions in the middle thereof, are formed.

Furthermore, on the substrate 110, a TFT 117, an auxiliary capacitance electrode 118, and a picture element electrode 120 are formed in each picture element region. For the TFT 117, a part of the gate bus line 111 works as a gate electrode. As shown in FIG. 15, above this gate electrode, a semiconductor film 114a, which is an active layer for the TFT 117, and a channel protection film 114b are formed. A drain electrode 117a and a source electrode 117b are disposed on both sides of the semiconductor film 114a to face each other. The drain electrode 117a is connected to the data bus line 115.

The auxiliary capacitance electrode 118 is formed at a position facing the auxiliary capacitance bus line 112 with a first insulating film 113 interposed therebetween. This auxiliary capacitance electrode 118, the auxiliary capacitance bus line 112, and the insulating film 113 interposed therebetween form an auxiliary capacitance Cs.

A picture element electrode 120 is formed of transparent conductive material such as indium-tin oxide (ITO). On the picture element electrode 120, slits 120a, extending in an oblique direction with respect to the Y-axis direction, are provided as alignment control structures. The slits 120a are formed approximately symmetrically on upper and lower sides with respect to a center line of the auxiliary capacitance bus line 112. In this embodiment, the slits 120a are 10 µm wide.

A second insulating film 119 is formed between the data bus lines 115, the TFT 117, and the auxiliary capacitance electrode 118, and the picture element electrode 120. The picture element electrode 120 is electrically connected to the source electrode 117b and the auxiliary capacitance electrode 118 through contact holes 119a and 119b formed in the second insulating film 119. The surface of the picture element electrode 120 is covered with a vertical alignment film (not illustrated) formed of polyimide.

On the other hand, over (in FIG. 15, under) the glass substrate 130a which is a base for the opposing substrate 130, a black matrix (light blocking film) 131, a color filter 132, a common electrode 133, a transparent insulating film 135 which is a cell gap adjusting structure, and bank-like protrusions 136 which are alignment control structures are formed.

The black matrix 131 is formed of metal such as Cr (chromium) or black resin, and is placed at a position facing the gate bus lines 111, the data bus lines 115, and the TFT 117 on the side of the TFT substrate 110. There are color filters of three different colors, red (R), green (G), and blue (B). A color filter of any one color among red, green, and blue is placed in each picture element.

The common electrode 133 is formed of a transparent conductive material such as ITO, and is formed on (in FIG. 15, below) the color filter 132. Here, the transparent insulating film 135 is formed on roughly half of the region of one picture element. In this embodiment, a cell gap (thickness of the liquid crystal layer 140) of a region (region I) where the transparent insulating film 135 is not formed is approximately 4 µm, and a cell gap of a region (region II) where the transparent insulating film 135 is formed is approximately 2 µm.

The protrusions 136 being the alignment control structures are formed of dielectric material, for example, photosensitive resin. As shown in FIG. 14, these protrusions 136 are formed in parallel to the slits 120a in regions between the slits 120a of the picture element electrode 120. In this application, the protrusions 136 are 10 μm wide and 1.5 μm high. In addition, the intervals between the protrusions 136 and the slits 120a are 25 μm.

In the liquid crystal display device constituted as above, in the region I where the cell gap is 4 μm, an overshoot in which luminance is higher than that in a stable state occurs during a period from a time when a voltage is applied to a time when the luminance comes to a stable state. On the other hand, in the region II where the cell gap is 2 μm, no overshoot occurs. After a voltage is applied, the luminance increases as time passes, and comes to a stable state. By adjusting an area ratio of these two regions, an overshoot rate of the entire picture element is set not more than 10%, and thereby a favorable moving image display capability can be obtained in which response speed is fast and no after image caused by overshoots exists.

Figure 16:
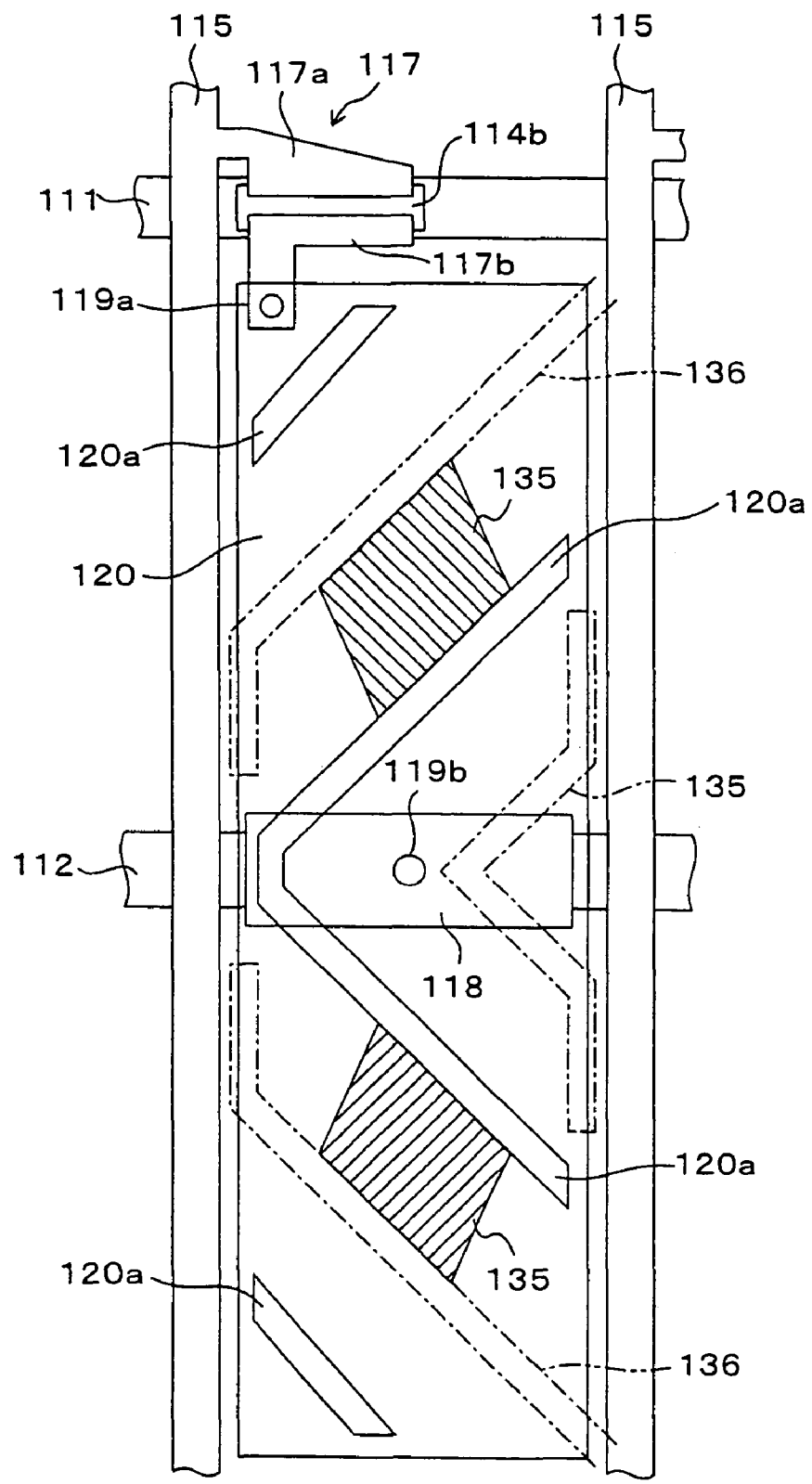
FIG. 16 is a plan view showing a liquid crystal display device of the first embodiment which is used for measuring a response time.

Following descriptions are about manufacturing a liquid crystal display device with the structure described above according to this embodiment, and about measured results of response speed of the liquid crystal display device. Here, the transparent insulating films 135 are formed on positions shown by shaded portions in a plan view of a picture element in FIG. 16.

The picture element electrode 120 and the common electrode 133 were formed by sputtering the ITO with 100 nm in thickness, respectively. For the transparent insulating film 135 and the protrusions 136, photosensitive acrylic resin manufactured by JSR Corporation was used, and they were formed in a predetermined pattern by using a photoresist method. In addition, an alignment film is formed by applying an alignment film material manufactured by JSR Corporation on the surfaces of the TFT substrate 110 and the opposing substrate 130 by a print processing method, and thereafter by heating the applied film material at a temperature of 200 degrees Celsius for 40 minutes.

As described above, the cell gap in the region I is 4 μm, the cell gap in the region II is 2 μm, the slits 120a are 10 μm wide, and the protrusions 136 are 10 μm wide and 1.5 μm high. Moreover, intervals between the slits 120a and the protrusions 136 are 25 μm.

Figure 17:
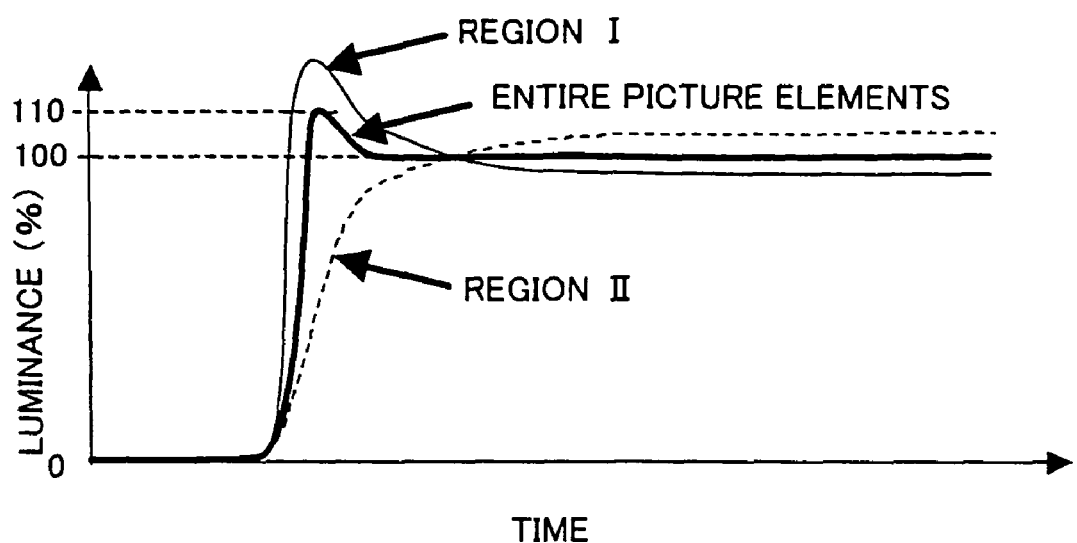
FIG. 17 is a view showing response characteristics of the liquid crystal display device of the first embodiment.

FIG. 17 is a view showing response characteristics of the liquid crystal display device of this embodiment, with time on the horizontal axis, and with luminance on the vertical axis. In FIG. 17, the luminance at a stable time is set to 100%.

In the regions II where the cell gap is small, the luminance changes gradually from dark to bright, and comes to a stable state. In the region I where the cell gap is large, the luminance once exceeds 110%, and thereafter comes to the stable state. As a result, in the entire picture element, the peak luminance is less than or equal to 110%.

Rise time tr of the liquid crystal display device of this embodiment was measured, and it was 8 ms. In addition, it was confirmed that no after image was perceived in this liquid crystal display device. On the other hand, a liquid crystal display device (conventional one), which has the same configuration as that of this embodiment except that transparent insulating film 135 is not included, was manufactured; and the measured rise time tr thereof was 15 ms. Hence, it was confirmed that the liquid crystal display device of this embodiment was effective in improving response characteristics.

Note that, in this embodiment, although the linearly polarizing plates are disposed on the both sides of the liquid crystal panel 100, circular polarizing plates may be used instead. In a case of the circular polarizing plates, since there is principally no influence exerted on luminance by change of an orientation angle, an effect for improving response characteristics becomes small. However, since transmittance is improved, a high-luminance panel can be realized.

Second Embodiment

Figure 18:
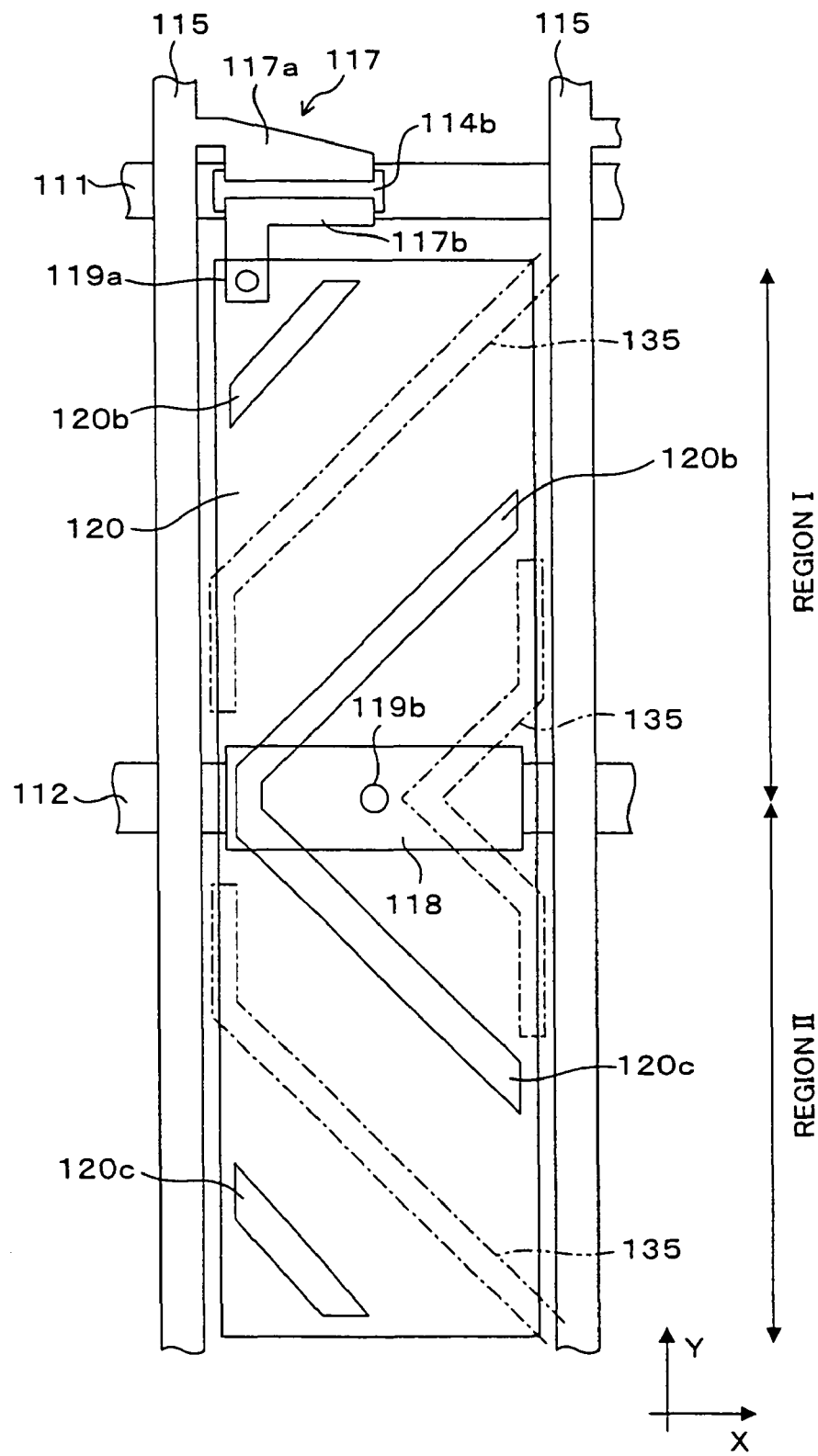
FIG. 18 is a plan view showing a liquid crystal display device of a second embodiment of the present invention.
Figure 19:
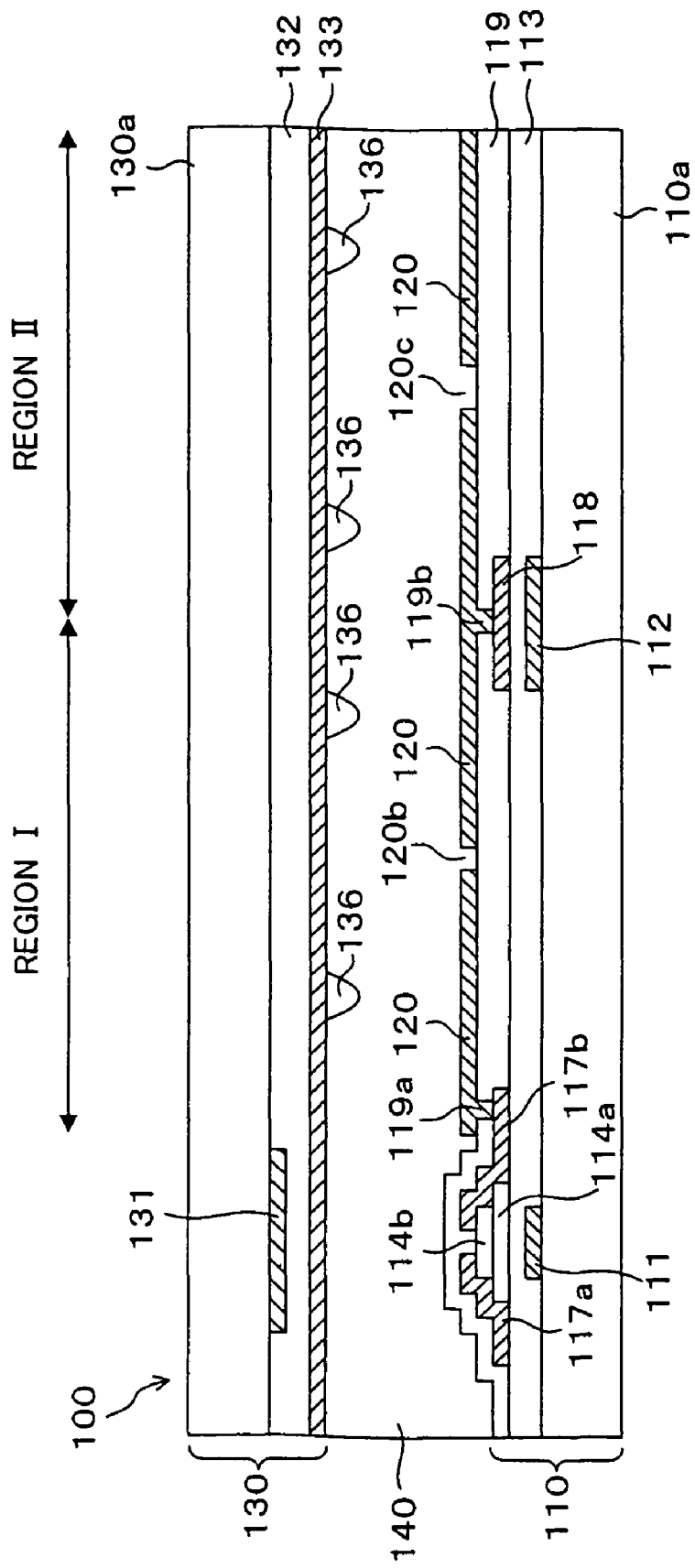
FIG. 19 is a schematic sectional view showing the liquid crystal display device of the second embodiment.

FIG. 18 is a plan view showing a liquid crystal display device of a second embodiment of the present invention, and FIG. 19 is a schematic sectional view showing the same. In FIGS. 18 and 19, the same reference numerals are used to designate the same components as those in FIGS. 14 and 15.

In this embodiment, width of a slit 120b of a picture element electrode 120 in a region I is 6 μm, and width of a slit 120c of the picture element electrode 120 in a region II is 12 μm. Furthermore, in this embodiment, there is no part corresponding to the transparent insulating film 135 of the first embodiment, and both cell gaps (thickness of a liquid crystal layer 140) of the regions I and II are 4 μm.

Figure 20:
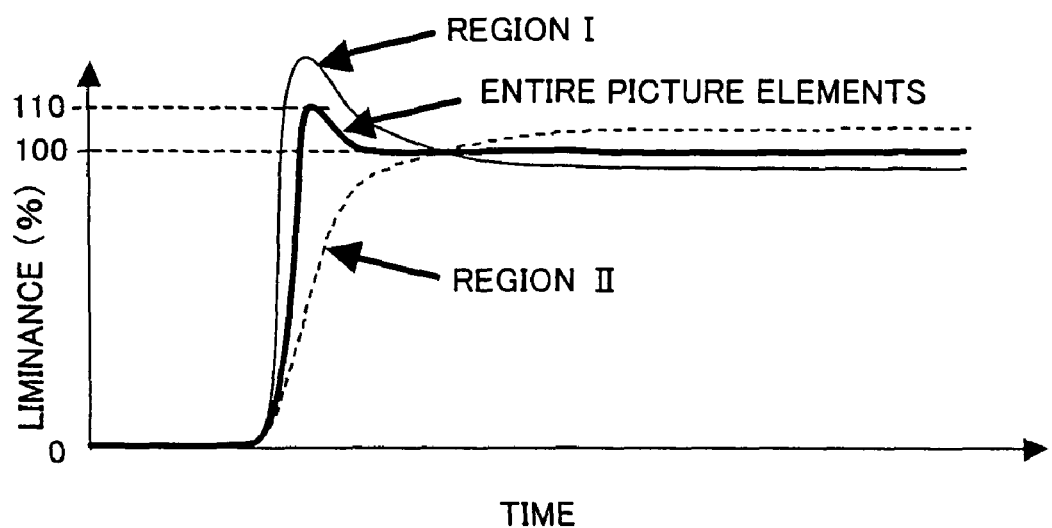
FIG. 20 is a view showing response characteristics of the liquid crystal display device of the second embodiment.

FIG. 20 is a view showing response characteristics of a liquid crystal display device of this embodiment, with time on the horizontal axis and with luminance on the vertical axis. As shown in FIG. 20, in this embodiment, an overshoot occurs in the region I where the slit width is 6 μm, and no overshoot occurs in the region II where the slit width is 12 μm. It is possible to make the response time shorter than that of a conventional one. In addition, an overshoot rate of an entire picture element is less than or equal to 110%, and occurrence of after image can be avoided.

Third Embodiment

Figure 21:
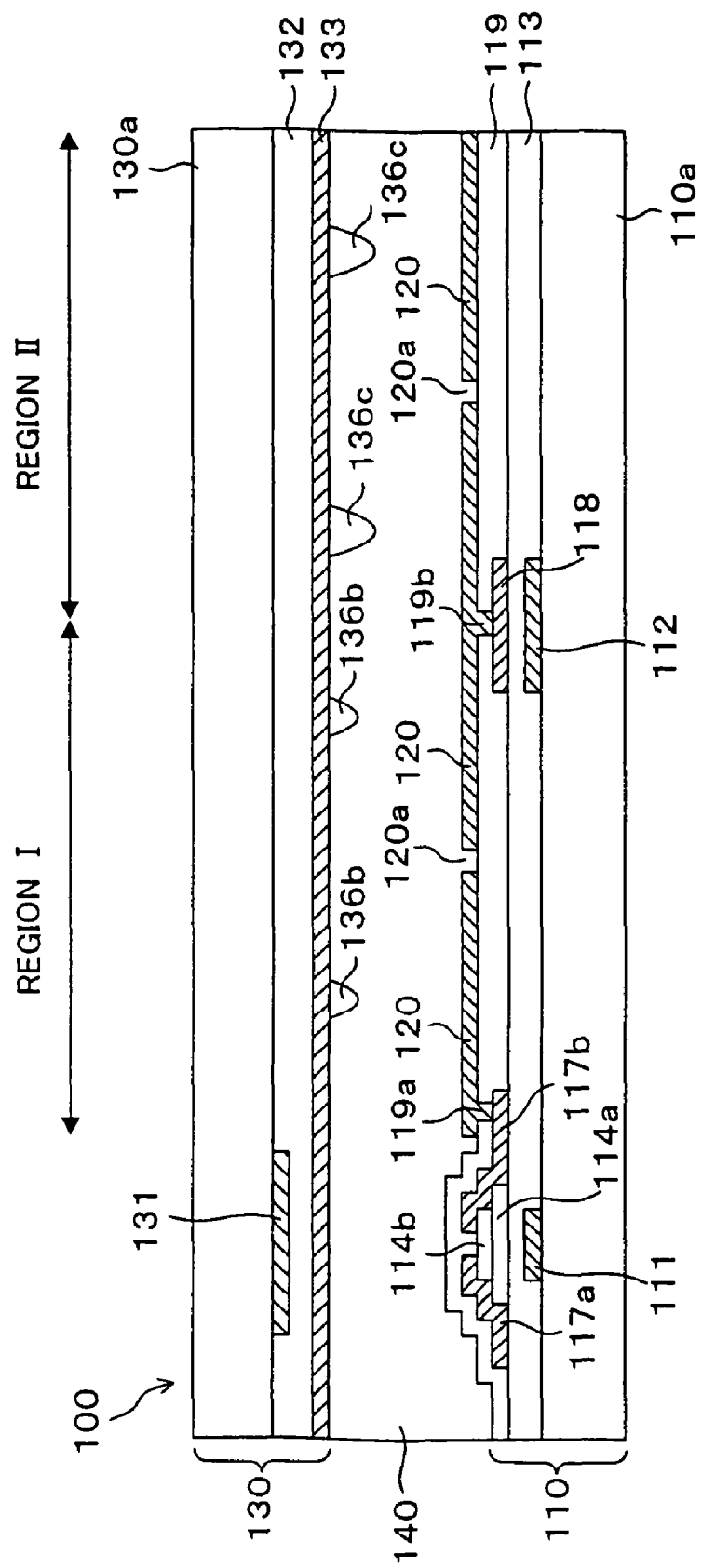
FIG. 21 is a schematic sectional view showing a liquid crystal display device of a third embodiment of the present invention.

FIG. 21 is a schematic sectional view showing a liquid crystal display device of a third embodiment of the present invention. Here, in FIG. 21, the same reference numerals are used to designate the same components as those in FIG. 15.

In this embodiment, height of protrusions 136b in a region I are 0.8 μm, and height of protrusions 136c in a region II are 2 μm. In this embodiment, there is also no part corresponding to the transparent insulating film 135 of the first embodiment, and both cell gaps of the regions I and II are 4 μm.

Figure 22:
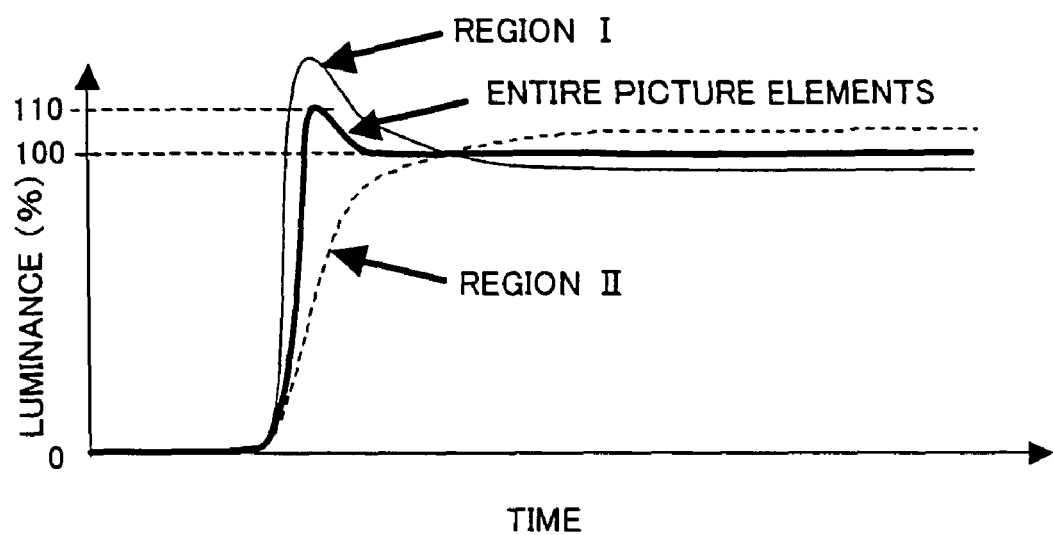
FIG. 22 is a view showing response characteristics of the liquid crystal display device of the third embodiment.

FIG. 22 is a view showing response characteristics of a liquid crystal display device of this embodiment, with time on the horizontal axis and with luminance on the vertical axis. As shown in FIG. 22, in this embodiment, an overshoot occurs in the region I where the height of the protrusions 136b are 0.8 μm, and no overshoot occurs in the region II where the height of the protrusions 136c are 2 μm. It is possible to make the response time shorter than that of a conventional one. In addition, an overshoot rate of an entire picture element is less than or equal to 110%, and occurrence of after image can be avoided.

Figure 23:
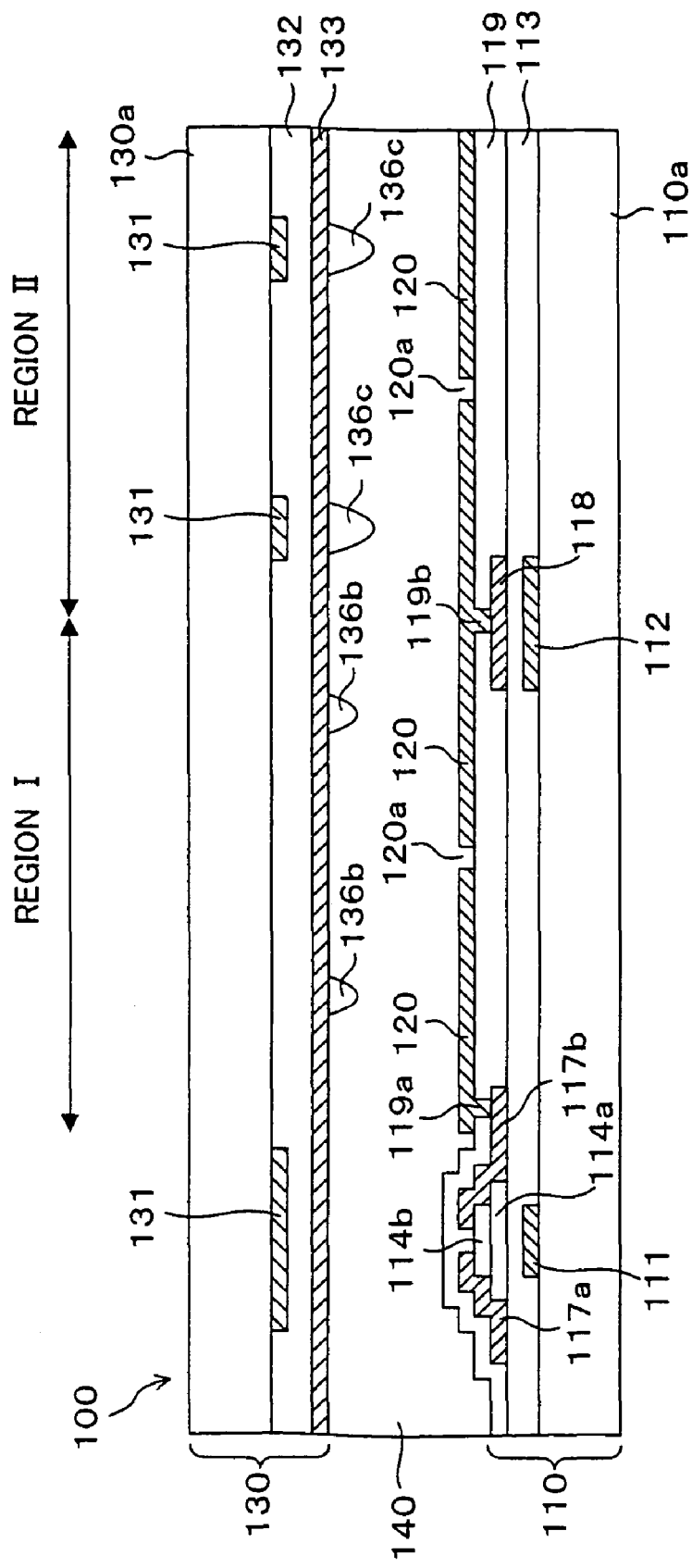
FIG. 23 is a schematic sectional view showing a modified example of the liquid crystal display device of the third embodiment.

FIG. 23 is a schematic sectional view showing a modified example of the liquid crystal display device of the third embodiment. In FIG. 23, the same reference numerals are used to designate the same components as those in FIG. 21.

In this modified example of the liquid crystal display device, black matrices 131 are also disposed in regions corresponding to the protrusions 136c placed in the region II. At the time of a black display, liquid crystal molecules in the vicinity of a protrusion are aligned in a direction perpendicular to an inclined surface of the protrusion, so that leakage of light occurs. In this embodiment, especially, since the protrusions 136c in the region II are formed to be large in size, a ratio of the leakage of light is conceived to be larger than that of a conventional liquid crystal display device.

As shown in FIG. 23, since the black matrices 131 are disposed in the regions corresponding to the protrusions 136c, the leakage of light in the vicinities of the protrusions 136c can be prevented, and contrast characteristics are improved.

Forth Embodiment

Figure 24:
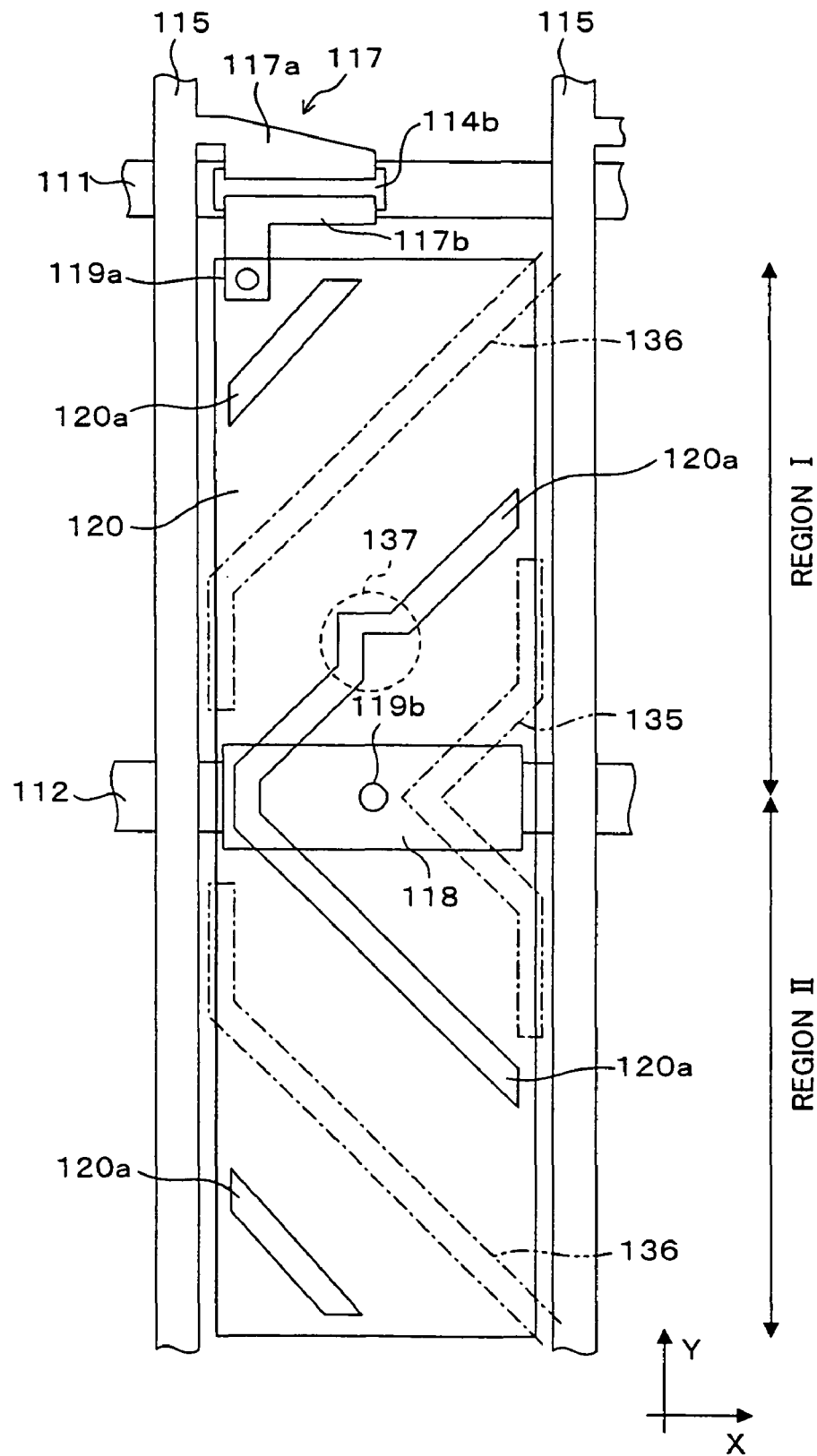
FIG. 24 is a plan view showing a liquid crystal display device of a forth embodiment of the present invention.

FIG. 24 is a plan view showing a liquid crystal display device of a forth embodiment of the present invention. Incidentally, in FIG. 24, the same reference numerals are used to designate the same components as those in FIG. 14. In this embodiment, both cell gaps in regions I and II are also 4 µm.

In this embodiment, as shown in FIG. 24, a portion (a portion circled by a dashed line in the drawing; and hereinafter, referred to as a bent portion 137) of slits 120a in the region I is bent along sides of an isosceles right triangle in which a base is 10 µm and a height is 5 µm. By providing the bent portion 137 as described above, when a voltage is changed from a black display voltage to a white display voltage or a halftone display voltage, an overshoot occurs in the region I, and luminance once increases up to the maximum point. Thereafter the luminance decreases down to a point corresponding to the white display voltage or the halftone display voltage, and comes to a stable state.

Figure 25:
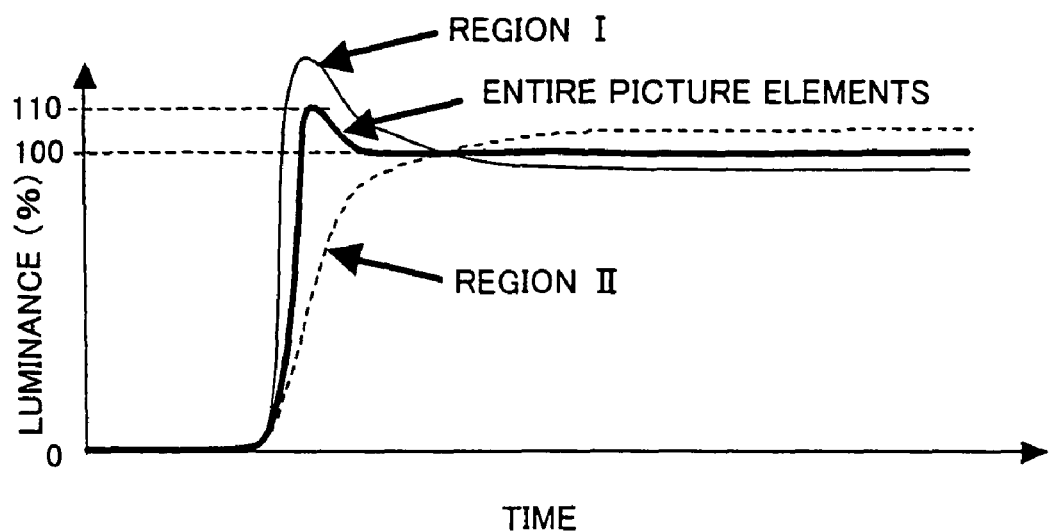
FIG. 25 is a view showing response characteristics of the liquid crystal display device of the forth embodiment.

FIG. 25 is a view showing response characteristics of the liquid crystal display device of this embodiment, with time on the horizontal axis and with luminance on the vertical axis. As shown in FIG. 25, in this embodiment, an overshoot also occurs in the region I where the bent portion 137 is disposed, and no overshoot occurs in the region II where no bent portion is provided. Accordingly, it is possible to make a response time shorter than that of a conventional one. In addition, an overshoot rate of an entire picture element is less than or equal to 110%, and occurrence of after image can be avoided.

Fifth Embodiment

Figure 26:
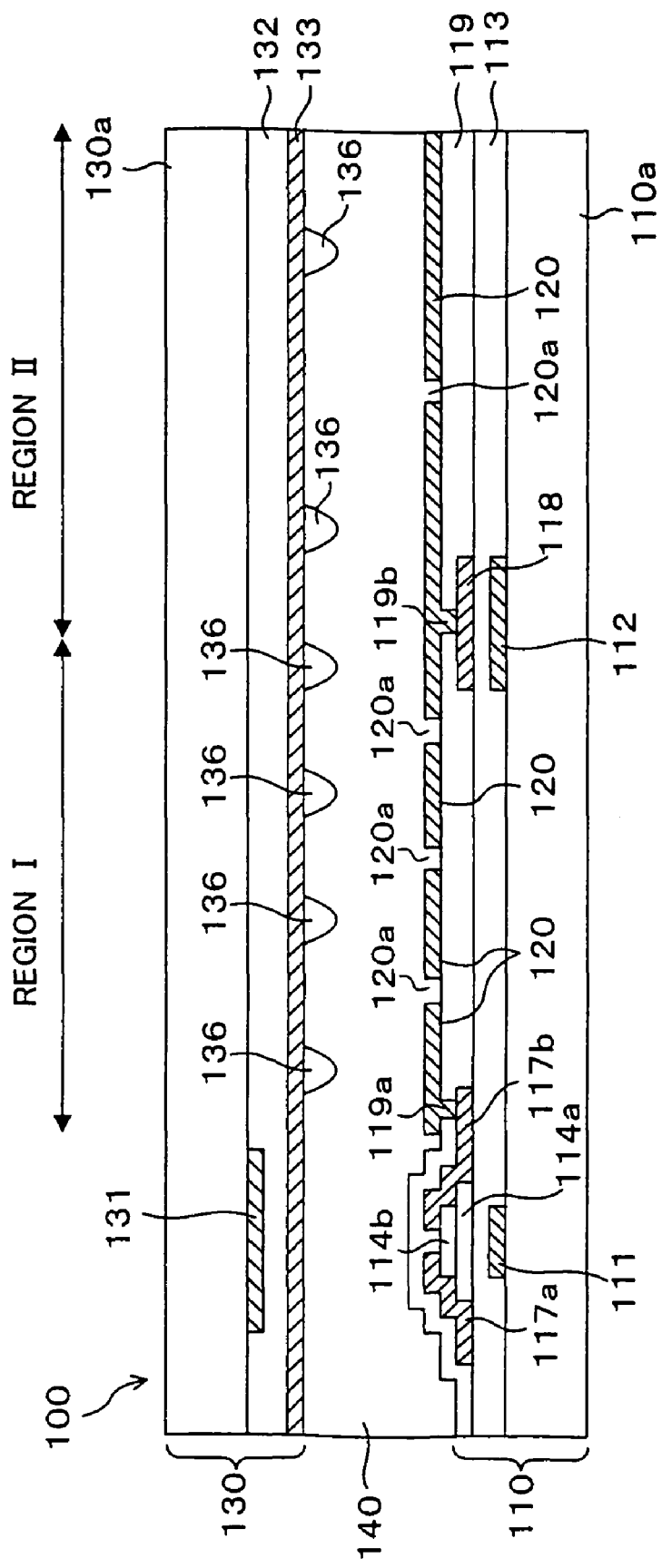
FIG. 26 is a schematic sectional view showing a liquid crystal display device of a fifth embodiment of the present invention.

FIG. 26 is a schematic sectional view showing a liquid crystal display device of a fifth embodiment of the present invention. In FIG. 26, the same reference numerals are used to designate the same components as those in FIG. 15.

In this embodiment, intervals between slits 120a and protrusions 136 in a region I are 5 µm, and intervals between the slits 120a and the protrusions 136 in a region II are 35 µm. In this embodiment, there is also no part corresponding to the transparent insulating film 135 of the first embodiment, and both cell gaps in the regions I and II are 4 µm.

Figure 27:
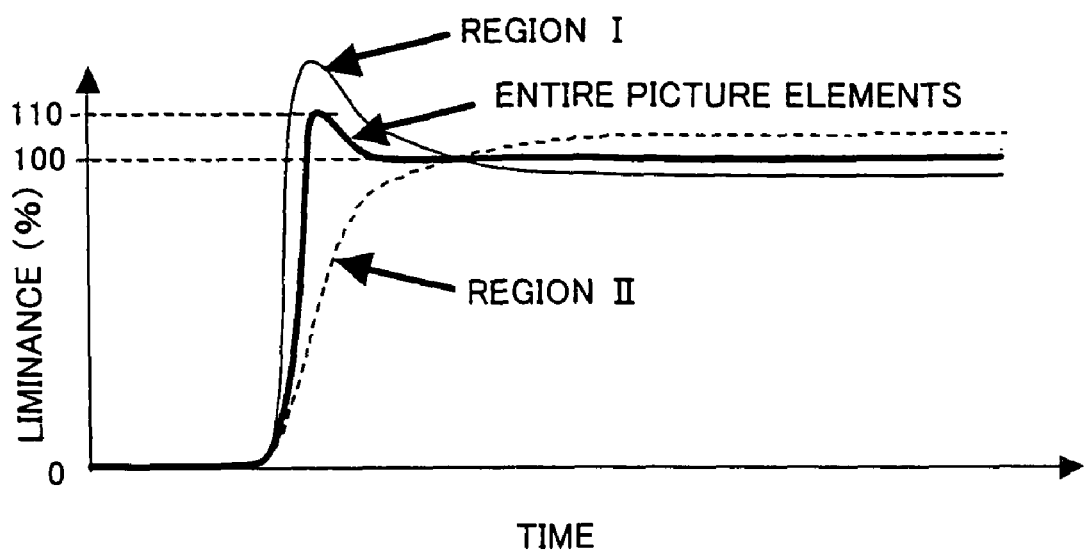
FIG. 27 is a view showing response characteristics of the liquid crystal display device of the fifth embodiment.

FIG. 27 is a view showing response characteristics of the liquid crystal display device of this embodiment, with time on the horizontal axis and with luminance on the vertical axis. As shown in FIG. 27, in this embodiment, an overshoot occurs in the region I where the intervals between the slits 120a and the protrusions 136 are 5 µm, and no overshoot occurs in the region II where the intervals between the slits 120a and the protrusions 136 are 35 µm. Consequently, it is possible to make a response time shorter than that of a conventional one. In addition, an overshoot rate of an entire picture element is less than or equal to 110%, and occurrence of after image can be avoided.

Sixth Embodiment

Figure 28:
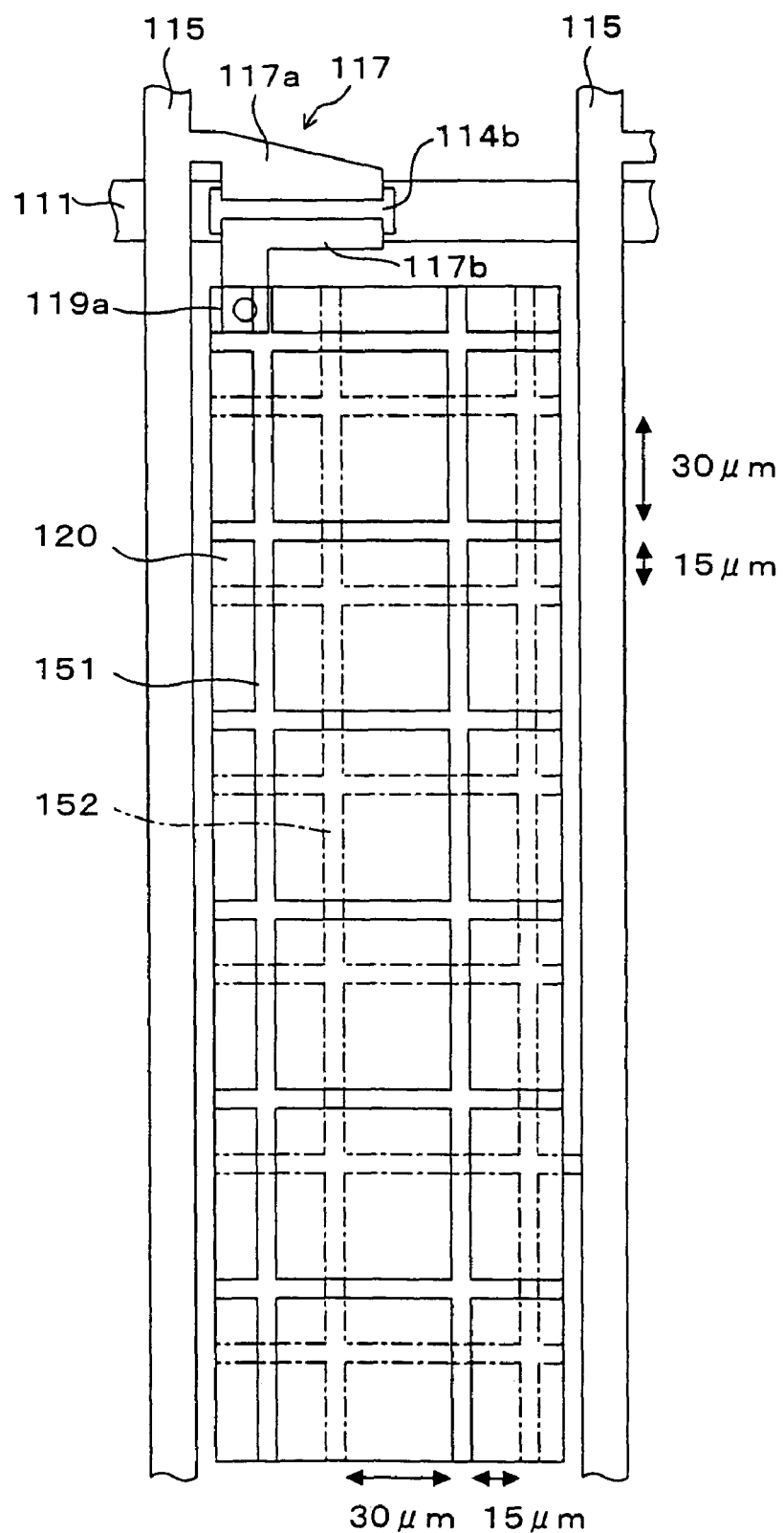
FIG. 28 is a plan view showing a liquid crystal display device of a sixth embodiment of the present invention.

FIG. 28 is a plan view showing a liquid crystal display device of a sixth embodiment of the present invention. In FIG. 28, the same reference numerals are used to designate the same components as those in FIG. 14. In FIG. 28, drawings of an auxiliary capacitance bus line, an auxiliary capacitance electrode, and the like are omitted.

In this embodiment, on a picture element electrode 120 on a side of a TFT substrate, bank-shaped protrusions 151 are formed as alignment control structures. On a common electrode on a side of an opposing substrate, bank-shaped protrusions 152 are formed as alignment control structures. These protrusions 151 and 152 are formed in a matrix pattern. As shown in FIG. 28, an interval between the protrusion 151 and the protrusion 152 on the right-hand side thereof is 15 µm; an interval between the protrusion 151 and a protrusion 152 on the left-hand side thereof is 30 µm; an interval between the protrusion 151 and a protrusion 152 on the upper side thereof is 30 µm; and an interval between the protrusion 151 and the protrusion 152 on the lower side thereof is 15 µm. These protrusions 151 and 152 are 8 µm wide and 0.8 µm high.

As described in the foregoing, alignment of liquid crystal molecules in the vicinity of an alignment control structure becomes stable in a short time. In addition, as shown in FIGS. 4A and 4B, overshoots occur around the protrusions 151 and 152. On the other hand, it takes time for liquid crystal molecules in a region away from the alignment control structure to become stable, and an overshoot does not occur. In other words, in this embodiment, regions in the vicinities of the protrusions 151 and 152 are regions I where an overshoot occurs, and regions away from the protrusions 151 and 152 are regions II where no overshoot occur; and the intervals between the protrusions 151 and the protrusions 152 are adjusted so that an area ratio (in other words, an overshoot rate of an entire picture element) of the region I and the region II is adjusted.

Figure 29:
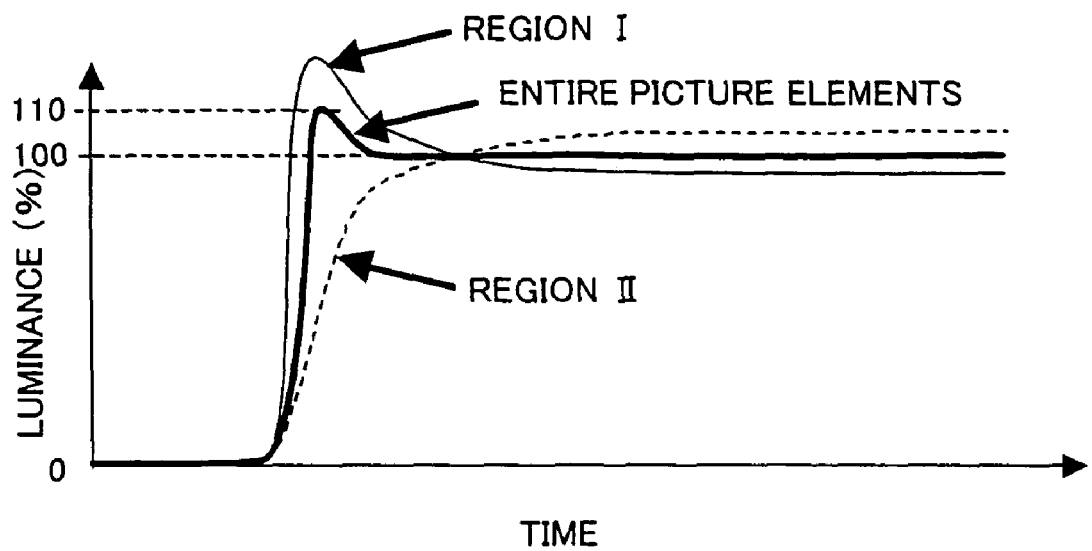
FIG. 29 is a view showing response characteristics of the liquid crystal display device of the sixth embodiment.

FIG. 29 is a view showing response characteristics of the liquid crystal display device of this embodiment with time on the horizontal axis and with luminance on the vertical axis. As shown in FIG. 29, in this embodiment, a region (region I) where an overshoot occurs and a region (region II) where no overshoot occurs are formed, and a response time can be shortened in comparison to that of a conventional one. In addition, an overshoot rate of an entire picture element is less than or equal to 110%, and occurrence of an after image can be avoided.

Seventh Embodiment

In an MVA liquid crystal display device, there occurs a phenomenon, wherein when a screen is viewed from an oblique direction, luminance differences between a red picture element, a green picture element, and a blue picture element become small, and then the screen becomes whitish (hereinafter, referred to as wash out). In order to suppress this phenomenon, it is known to be effective that, in one picture element, a plurality of regions with T-V characteristics (transmittance-voltage characteristics) different from each other are formed. As described above, when a plurality of regions with the T-V characteristics different from each other are formed in one picture element, the T-V characteristics of the entire picture element becomes a mean of the T-V characteristics of the respective regions. Accordingly, it becomes possible to suppress the phenomenon, wherein when the screen is viewed from an oblique direction, the screen becomes whitish (wash out).

Figure 30:
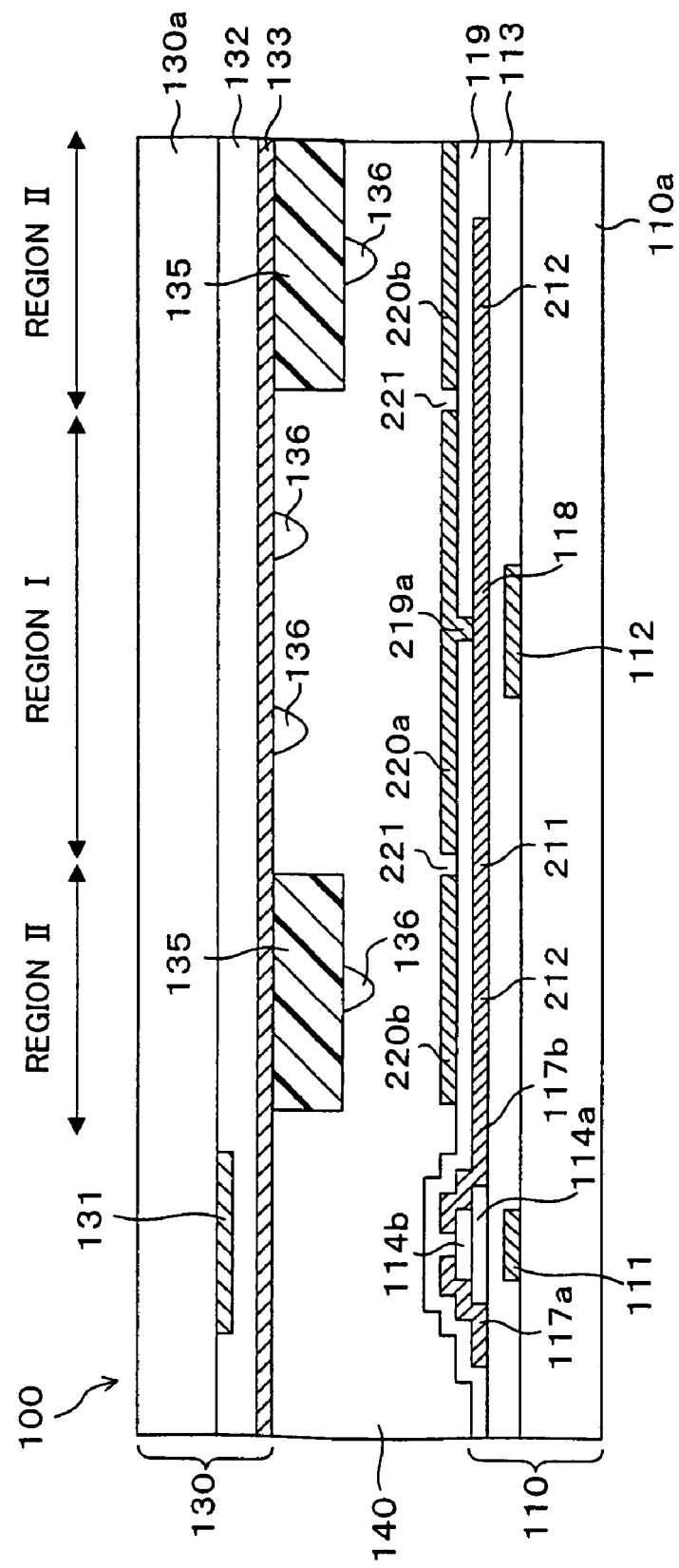
FIG. 30 is a schematic sectional view showing a liquid crystal display device of a seventh embodiment of the present invention.

FIG. 30 is a schematic sectional view showing a liquid crystal display device of a seventh embodiment of the present invention. Here, in FIG. 30, the same reference numerals are used to denote the same components as those in FIG. 15.

In this embodiment, a region of one picture element is divided into a region I where a cell gap is set to 4 µm to cause an overshoot to occur, and a region II where a cell gap is set to 2 μm with a transparent insulating film 135 not to cause an overshoot to occur.

In this embodiment, sub picture element electrodes 220a and 220b made of a transparent conductive material such as ITO are formed on a second insulating film 119. The sub picture element electrode 220a is disposed in the region I, and the sub picture element electrodes 220b are disposed in the regions II. These sub picture element electrodes 220a and 220b are electrically separated from each other with slits 221.

Furthermore, in this embodiment, a wiring 211 and a control electrode 212 are formed on a first insulating film 113. The control electrode 212 is disposed under the sub picture element electrode 220b. The wiring 211 allows a source electrode 117b of a TFT 117, the control electrode 212, and an auxiliary capacitance electrode 118 to be electrically connected to each other.

The sub picture element electrode 220a is electrically connected to the auxiliary capacitance electrode 118 and the wiring 211 through a contact hole 219a formed in the second insulating film 119. The sub picture element electrode 220b is capacitively coupled to the control electrode 212 through the second insulating film 119.

In the liquid crystal display device of this embodiment, when the TFT 117 is turned on with a scanning signal which is provided to gate bus lines 111, a display voltage (display signal) is supplied from data bus lines to the wiring 211, the control electrode 212, and the auxiliary capacitance electrode 118 through the TFT 117. To the sub picture element electrode 220a, a display voltage is applied directly through the contact hole 219a. On the other hand, to the sub picture element electrode 220b, a voltage, which is divided into a capacitance between the control electrode 212 and the sub picture element electrode 220b, and a capacitance (liquid crystal capacitance) between the sub picture element electrode 220b and a common electrode 133, is applied. Accordingly, a voltage applied to the sub picture element electrode 220b is lower than that applied to the sub picture element electrode 220a, and it appears that, in one picture element, there are two regions where T-V characteristics are different from each other.

As described above, when there are a plurality of regions where the T-V characteristics are different from each other, the T-V characteristics of the entire picture element becomes a mean of the T-V characteristics of these regions, whereby it is attainable to suppress the phenomenon wherein when the screen is viewed from an oblique direction, the screen becomes whitish (wash out).

In this embodiment, an effect similar to that of the first embodiment can be achieved, and, in addition, another effect is achieved in which gray scale viewing angle characteristics is improved.

Note that, in this embodiment, the sub picture element electrode 220b to which the control electrode 212 is capacitively coupled is disposed in the region II where no overshoot occurs. Granted that the control electrode and the sub picture element electrode capacitively coupled thereto are disposed in the region I where an overshoot occurs, and the sub picture element electrode directly connected (connected without a capacitive coupling) to the TFT 117 is disposed in the region II where no overshoot occurs, luminance difference between the respective regions becomes small, and an effect of suppressing wash out becomes small. Accordingly, as in this embodiment, it is preferred that the sub picture element electrode directly connected to the TFT be disposed in the region I where an overshoot occurs, and that the control electrode and the sub picture element electrode capacitively coupled thereto be disposed in the region II where no overshoot occurs.

Although, in this embodiment, an example of combining the liquid crystal display device of the first embodiment with a wash out prevention technology is described above, it is of course possible to combine a liquid crystal display device of another embodiment with the wash out prevention technology described above.

Eighth Embodiment

Figure 31A:
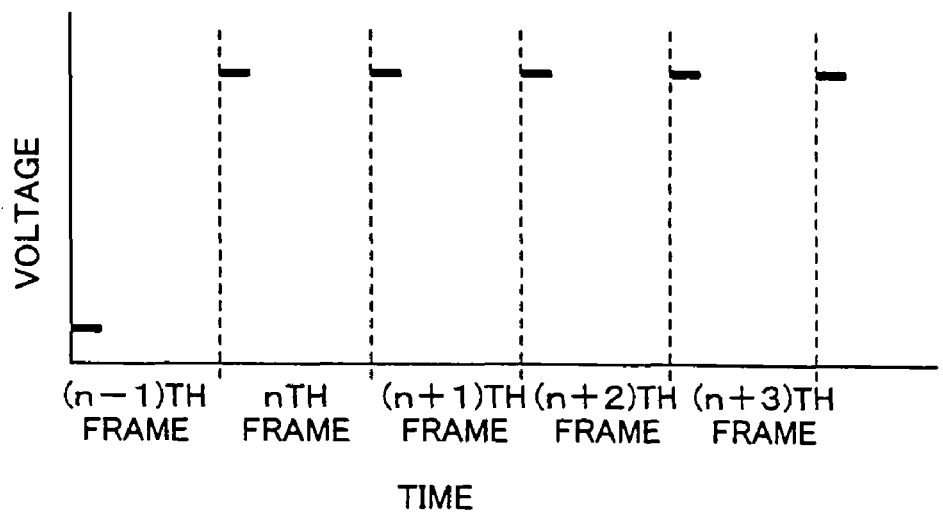
FIGS. 31A and 31B are views showing driving methods of a liquid crystal display device of an eighth embodiment of the present invention.
Figure 31B:
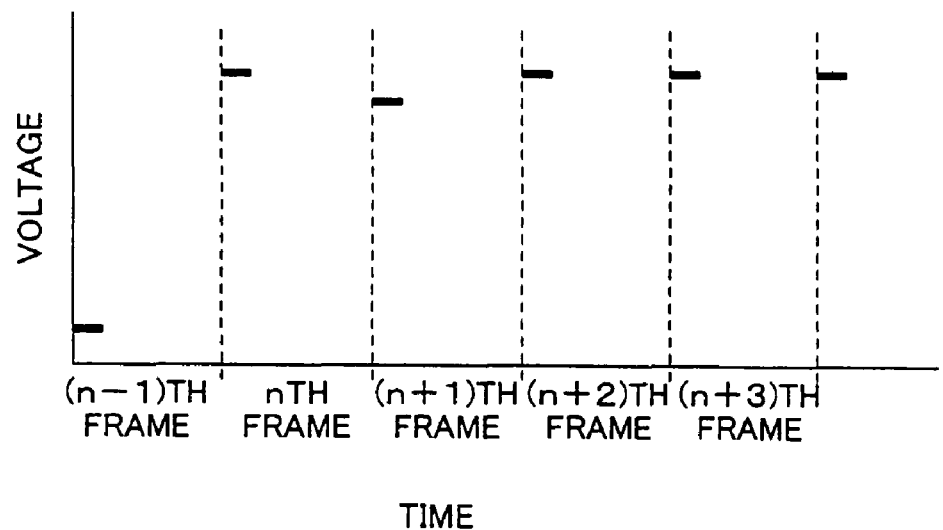

FIGS. 31A and 31B are views showing a change of a display signal voltage when a display is changed from a black display to a white display (or a halftone display), with time on the horizontal axis and with voltage on the vertical axis. Here, in these figures, frames up to the (n−1) th frame are in a case of black displays, and the n th frame and the frames subsequent thereto are in cases of white displays. Here, n is an arbitrary integer.

In general, when the display is changed from the black display to the white display (or the halftone display), a white display voltage (or a halftone display voltage) is applied in the n th frame as shown in FIG. 31A. When the driving method in the above manner is applied to a liquid crystal display device of the first to the seventh embodiments, it is conceivable that luminance becomes higher than the desired luminance for overshoot. In such a case, as shown in FIG. 31B, in the n th frame, a white display voltage (or a halftone display voltage) is supplied to data bus lines; in the (n+1) th frame, a voltage slightly lower than the white display voltage (or the halftone display voltage) is supplied thereto; and, in the (n+2) th frame and in the frames subsequent thereto, the white display voltage (or the halftone display voltage) is supplied. Thus, the maximum luminance in response is adjusted, and the luminance can be prevented from becoming excessively high.

Ninth Embodiment

As described above, in order to cause an overshoot to occur in response characteristics of an entire picture element, it is necessary that alignment of liquid crystal molecules in the region II where no overshoot occurs becomes stable in a short time (refer to FIGS. 5 and 6). Although the alignment of the liquid crystal molecules in the vicinities of the alignment control structures becomes stable in a short time, the alignment of liquid crystal molecules away from the alignment control structures needs a relatively long time to become stable. Making intervals between the alignment control structures small may be conceived in order for the alignment of liquid crystal molecules in the region II to become stable in a short time. However, in that case, a problem arises that an aperture ratio decreases so that the screen becomes dark.

Thus, in this embodiment, by performing an alignment process for determining in advance an alignment direction of liquid crystal molecules, time which the alignment of the liquid crystal molecules becomes stable is shortened, and thereby it is secured to cause an overshoot to occur in response characteristics of the entire picture element.

Figure 32:
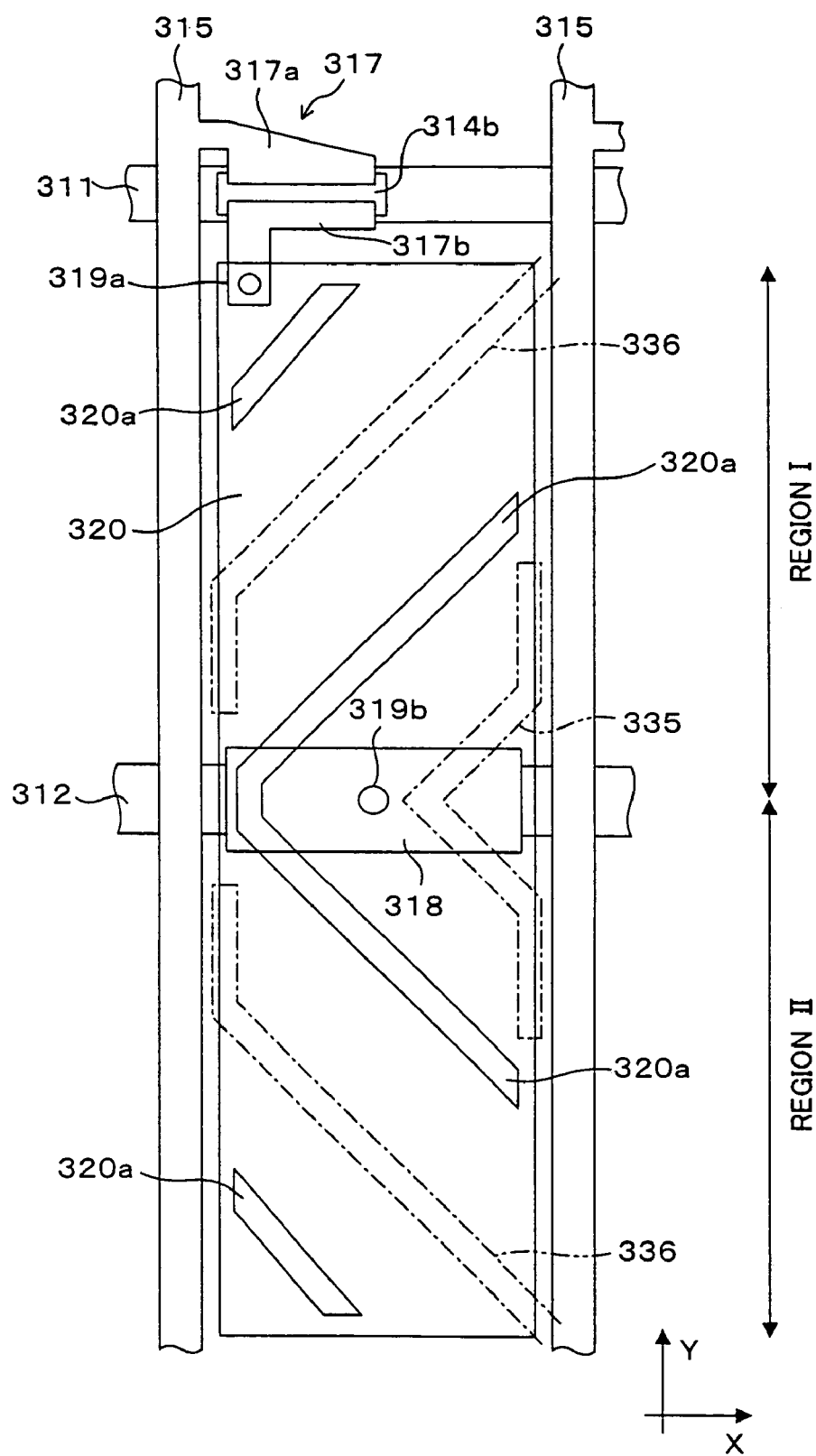
FIG. 32 is a plan view showing a liquid crystal display device of a ninth embodiment of the present invention.
Figure 33:
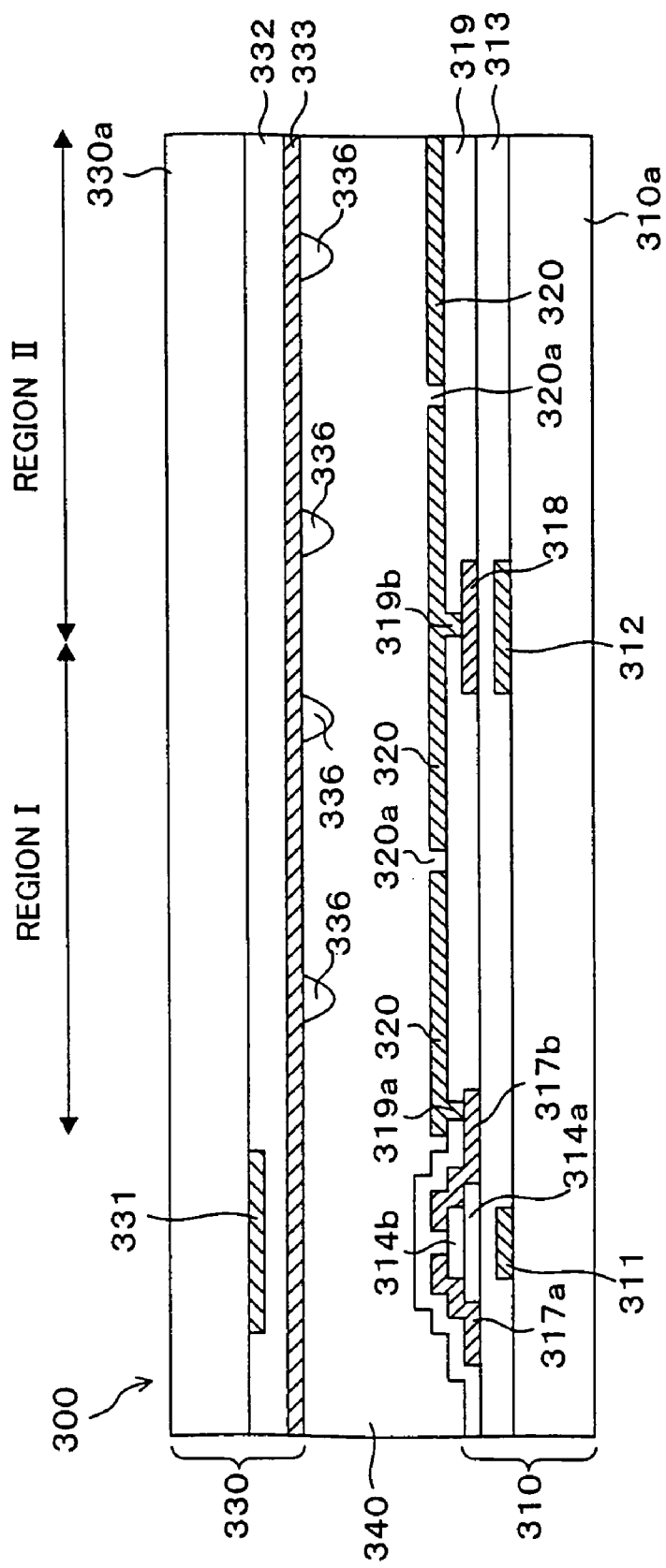
FIG. 33 is a schematic sectional view showing the liquid crystal display device of the same.

FIG. 32 is a plan view showing a liquid crystal display device of a ninth embodiment of the present invention, and FIG. 33 is a schematic sectional view showing the same.

As shown in FIG. 33, a liquid crystal panel 300 includes a TFT substrate 310, an opposing substrate 330, and a liquid crystal layer 340. The liquid crystal layer 340 is formed of liquid crystals with negative dielectric anisotropy, and the liquid crystals are sealed between the TFT substrate 310 and the opposing substrate 330. Additionally, in the liquid crystal layer 340, polymer, which determines the alignment direction of the liquid crystal molecules, is formed. As described later, this polymer is formed by polymerizing polymer constituents (monomer or oligomer) added in the liquid crystals.

Besides the method of forming the polymer in the liquid crystal layer as described above, in terms of an alignment process so as to determine an alignment direction of liquid crystal molecules, there are known methods such as a method of performing a rubbing process on an alignment film, and a method of irradiating an alignment film with ultraviolet rays from a predetermined direction. In the present invention, any one of the alignment processes may also be adopted instead of the forming of polymer in a liquid crystal layer.

Polarizing plates (not illustrated) are placed, respectively, on a front side (on an observer's side; on an upper side in FIG. 33) of the liquid crystal panel 300 and on a back side (on a lower side in FIG. 33) thereof, and further a backlight (not illustrated) is placed on the back side thereof. One polarizing plate is disposed such that its absorption axis coincides with X-axis shown in FIG. 32, and the other polarizing plate is disposed such that its absorption axis coincides with Y-axis.

As shown in FIG. 32, on a glass substrate 310a to be a base of the TFT substrate 310, a plurality of gate bus lines 311 extending in a horizontal direction (in the X-axis direction) and a plurality of data bus lines 315 extending in a vertical direction (in the Y-axis direction) are formed. The gate bus lines 311 are placed in the vertical direction at intervals of, for example, approximately 300 μm, and the data bus lines 315 are placed in the horizontal direction at intervals of, for example, approximately 100 μm. Rectangular regions divided by these gate bus lines 311 and data bus lines 315 are picture element regions, respectively. On the TFT substrate 310, auxiliary capacitance bus lines 312, which are placed in parallel to the gate bus lines 311 and which cross the picture element regions in the middle thereof, are formed.

On the TFT substrate 310, a TFT 317, an auxiliary capacitance electrode 318, and a picture element electrode 320 are formed in each picture element region. For the TFT 317, one portion of the gate bus lines 311 works as a gate electrode. As shown in FIG. 33, a semiconductor film 314a, which is an active layer for the TFT 317, and a channel protection film 314b are formed over the above described gate electrode; and a drain electrode 317a and a source electrode 317b are placed on both sides of the semiconductor film 314a to face each other. The drain electrode 317a is connected to the data bus line 315.

In addition, the auxiliary capacitance electrode 318 is formed at a position facing the auxiliary capacitance bus line 312 with a first insulating film 313 interposed therebetween. This auxiliary capacitance electrode 318, the auxiliary capacitance bus line 312, and the first insulting film 313 interposed therebetween form an auxiliary capacitance Cs. In this embodiment, a capacitance value of the auxiliary capacitance Cs is set to, for example, that of a liquid crystal capacitance $C_{LC}$ at the time when no voltage is applied.

A picture element electrode 320 is formed of a transparent conductive material such as ITO. Slits 320a, extending in an oblique direction with respect to the Y-axis direction, are provided in the picture element electrode 320 as alignment control structures. The slits 320a are formed approximately symmetrically on upper and lower sides with respect to a center line of the auxiliary capacitance bus line 312.

A second insulating film 319 is formed between the data bus lines 315, the TFT 317, and the auxiliary capacitance electrode 318, and the picture element electrode 320; and the picture element electrode 320 is electrically connected to the source electrode 317b and the auxiliary capacitance electrode 318 through contact holes 319a and 319b formed in the second insulating film 319. A surface of the picture element electrode 320 is covered with a vertical alignment film (not illustrated) formed of, for example, a polyimide manufactured by JSR Corporation.

On the other hand, over (in FIG. 33, under) a glass substrate 330a which is a base for the opposing substrate 330, a black matrix (light blocking film) 331, a color filter 332, a common electrode 333, and bank-shaped protrusions 336 which are alignment control structures are formed. The black matrix 331 is formed with metal such as chromium (Cr), or black resin, and is placed at a position facing the gate bus lines 311, the data bus lines 315, and the TFT 317 on a side of the TFT substrate 310. There are color filters of three different colors, red (R), green (G), and blue (B). A color filter of any one color among red, green, and blue is placed in each picture element. The common electrode 333 is formed of a transparent conductive material such as ITO, and is formed on (in FIG. 33, below) the color filter 332. The bank-shaped protrusions 336 are formed with a dielectric material such as resin (for example, a resist material manufactured by Shipley Company, LLC). As shown in FIG. 32, these protrusions 336 are formed in parallel to the slits 320a in regions between the slits 320a of the picture element electrode 320. Surfaces of the common electrode 333 and the protrusions 336 are covered with a vertical alignment film (not illustrated) formed of, for example, a polyimide manufactured by JSR Corporation.

Hereinafter, a method of manufacturing the liquid crystal display device of this embodiment is described.

The TFT substrate 310 and the opposing substrate 330 are formed by the same method as a conventional one. Then, the TFT substrate 310 and the opposing substrate 330 are disposed to face each other with a spacer (not illustrated) interposed therebetween, and the liquid crystal panel 300 is formed by sealing liquid crystals with negative dielectric anisotropy between the TFT substrate 310 and the opposing substrate 330. At this time, in the liquid crystals, polymer constituents such as acrylate monomer are added in advance as polymer constituents.

Next, a predetermined voltage is applied to the gate bus lines 311, and thereby the TFT 317 of each picture elements is turned on; and furthermore a voltage is applied to the data bus lines 315, and liquid crystal molecules are aligned to a predetermined direction which can be determined with the alignment control structures (slits 320a and protrusions 336). After the alignment state of the liquid crystal molecules becomes stable, ultraviolet rays are irradiated, the polymer constituents are polymerized, and polymer, which determines the alignment direction of liquid crystal molecules at a time when a voltage is applied, is formed.

Incidentally, thermosetting polymer constituents may be used instead of light-curing (including ultraviolet rays) polymer constituents. As describe above, instead of forming the polymer in the liquid crystal layer, an alignment process in determining the alignment direction of liquid crystal molecules may be performed using a method of performing a rubbing process on an alignment film, or a method of irradiating an alignment film with ultraviolet rays from a predetermined direction.

Subsequently, polarizing plates are joined to both sides of the liquid crystal panel 300, and, in addition, a driving circuit, a backlight, and the like are also installed. In this way, the liquid crystal display device of this embodiment is fabricated.

Following descriptions are about actual manufacturing of liquid crystal display devices of this embodiment, and about measured results on response characteristics (rise time tr) of the liquid crystal display devices.

As Example 1, a liquid crystal display device having polymer, which determines an alignment direction of liquid crystal molecules, in a liquid crystal layer, was manufactured. When liquid crystals are sealed between a TFT substrate and an opposing substrate, 1 wt % of ultraviolet-curing type acrylate monomer is added in the liquid crystals in advance. The liquid crystals are sealed between the TFT substrate and the opposing substrate, and, thereafter, a voltage is applied between a picture element electrode and a common electrode. After an alignment of liquid crystal molecules is determined, ultraviolet rays are irradiated with 20 joule energy, and polymer is formed in a liquid crystal layer.

Furthermore, as Example 2, a liquid crystal display device in which a rubbing process is performed on the surface of an alignment film was manufactured. A rubbing direction is perpendicular to a direction in which protrusions and slits are extended.

As Comparative Example, a liquid crystal display device which has the same configuration as that of the first embodiment, except no polymer is contained in a liquid crystal layer, was manufactured. Note that the liquid crystal display devices of Examples 1, and 2, and of Comparative Example respectively have the structures shown in FIGS. 32 and 33. A slit is 10 μm wide; a protrusion is 1.4 μm high and 12 μm wide; an interval between the protrusions and the slits is 25 μm; and a cell gap is 3.8 μm. For liquid crystals, liquid crystals with negative dielectric anisotropy ($\Delta\varepsilon=-3.8$, $\Delta n=0.09$, NI point=70 degrees Celsius) manufactured by Merck Ltd were used. A capacitance value of an auxiliary capacitance Cs is set to one time as much as the capacitance of one picture element at a time when the power is off.

Overshoot rates and rise times of the Examples 1 and 2, and of Comparative Example were measured, and their results are tabulated as in Table 1 below.

TABLE 1

|  | Overshoot Rate | Rise Time (tr) |
| --- | --- | --- |
| Example 1 | 5% | 8 ms |
| Example 2 | 3% | 10 ms |
| Comparative Example | 1% | 14 ms |

As shown in Table 1, in the liquid crystal display device of the comparative Example, the overshoot rarely occurred, and the rise time was 14 ms. In contrast, in the liquid crystal display device of Example 1 in which polymer was formed in the liquid crystal layer, the overshoot rate was 5%, and the rise time was shortened to 8 ms. In the liquid crystal display device of Example 2 in which the rubbing process was performed on the alignment film, the overshoot rate was 3%, and the rise time was shortened to 10 ms. From these results, it was confirmed that this embodiment was effective in improving response characteristics.

Note that, in the liquid crystal display devices of the first to the eighth embodiments, it is of course possible to apply the alignment process described in this embodiment. Hence, adjustment of the overshoot rate can be easier.

There have been developed technologies for improving visibility of moving images by combining a high-speed response liquid crystal panel with a blinking backlight in which, at a certain cycle, an entire surface of a screen blinks at once or the surface thereof partially blinks one by one, or by inserting black color (or low gray scale) for a certain period of time for every one frame. By applying these technologies to the liquid crystal display devices of the first to the ninth embodiments, the display capability of moving images can be further improved.

What is claimed is:

1. A liquid crystal display device including a first substrate on which a picture element electrode and a switching element are disposed in every picture element, a second substrate on which a common electrode is disposed and which is placed to face the first substrate, and liquid crystals which are sealed between the first substrate and the second substrate, comprising:

a first region in the picture element in which, when a voltage applied to the picture element electrode changes from a first voltage to a second voltage, luminance increases up to a maximum point along with a change of an alignment state of liquid crystal molecules, and, thereafter, decreases down to a point at a stable time corresponding to the second voltage; and a second region in the picture element in which the luminance increases along with a change of the alignment state of the liquid crystal molecules, and comes to a point at the stable time corresponding to the second voltage, wherein the first region and the second region in the picture element are driven by a voltage applied to the picture element electrode through the switching element, and a maximum luminance value over the entire picture element is not greater than 110% of the luminance at the stable time corresponding to the second voltage.

2. The liquid crystal display device according to claim 1, wherein a cell gap of the first region is larger than that of the second region.

3. The liquid crystal display device according to claim 1, wherein alignment control structures for determining an alignment direction of liquid crystal molecules are formed on at least one of the first substrate and the second substrate.

4. The liquid crystal display device according to claim 3, wherein the alignment control structures are slits provided to at least one of the picture element electrode and the common electrode, and width of a slit in the first region is narrower than that of a slit in the second region.

5. The liquid crystal display device according to claim 3, wherein the alignment control structures are protrusions formed of a dielectric material, and height of a protrusion in the first region is lower than that of a protrusion in the second region.

6. The liquid crystal display device according to claim 3, wherein an interval between the alignment control structures in the first region is smaller than that between the alignment control structures in the second region.

7. The liquid crystal display device according to claim 3, wherein protrusions made of a dielectric material are formed in a matrix pattern on the first substrate and the second substrate as the alignment control structures, and one picture element is divided into a plurality of regions by the protrusions in the matrix pattern, the plurality of regions being different in size from each other.

8. The liquid crystal display device according to claim 1, wherein the picture element electrode is constituted by a plurality of sub picture element electrodes electrically separated from each other, and voltages applied to the respective sub picture element electrodes are different from each other.

9. The liquid crystal display device according to claim 8, wherein a voltage is applied through a capacitive coupling to at least one of the plurality of sub picture element electrodes.

10. The liquid crystal display device according to claim 1, wherein the liquid crystals are of negative dielectric anisotropy.

11. The liquid crystal display device according to claim 1, wherein polymer which determines an alignment direction of the liquid crystal molecules is formed by polymerizing polymer constituents which are added into the liquid crystals in advance.

12. The liquid crystal display device according to claim 1, wherein an alignment film on which a rubbing process is performed is formed on the first substrate and the second substrate.

13. The liquid crystal display device according to claim 1, wherein an alignment process in which ultraviolet rays are irradiated from an oblique direction is performed on surfaces of the first substrate and the second substrate.

* * * * *